(12) United States Patent
Jones et al.

(10) Patent No.: US 7,929,749 B1
(45) Date of Patent: Apr. 19, 2011

(54) SYSTEM AND METHOD FOR SAVING STATISTICAL DATA OF CURRENCY BILLS IN A CURRENCY PROCESSING DEVICE

(75) Inventors: William J. Jones, Barrington, IL (US); Robert J. Klein, Chicago, IL (US); Curtis W. Hallowell, Palatine, IL (US); Charles P. Jenrick, Chicago, IL (US)

(73) Assignee: Cummins-Allison Corp., Mount Prospect, IL (US)

( * ) Notice: Subject to any disclaimer, the term of this patent is extended or adjusted under 35 U.S.C. 154(b) by 1207 days.

(21) Appl. No.: 11/526,365

(22) Filed: Sep. 25, 2006

(51) Int. Cl.
*G06K 9/00* (2006.01)

(52) U.S. Cl. ........ 382/135; 382/137; 382/139; 382/140; 902/6; 902/7; 705/44; 209/534

(58) Field of Classification Search .................. 382/135, 382/137, 138, 139, 140; 902/6, 7; 209/534; 340/5.86
See application file for complete search history.

(56) References Cited

U.S. PATENT DOCUMENTS

| | | | |
|---|---|---|---|
| 446,303 A | 2/1891 | Thompson |
| 2,669,998 A | 2/1954 | Buchholz |
| 2,750,949 A | 6/1956 | Kulo et al. |
| 2,835,260 A | 5/1958 | Buchholz |
| 2,865,561 A | 12/1958 | Rosapepe |
| 2,936,684 A | 5/1960 | Simjian |
| 3,104,314 A | 9/1963 | Simjian |
| 3,132,654 A | 5/1964 | Adams |
| 3,148,932 A | 9/1964 | Simjian |
| 3,150,912 A | 9/1964 | Simjian |
| 3,173,742 A | 3/1965 | Simjian |
| 3,246,295 A | 4/1966 | DeClaris et al. |
| 3,280,974 A | 10/1966 | Riddle et al. |
| 3,443,107 A | 5/1969 | Modglin |
| 3,480,785 A | 11/1969 | Aufderheide |
| 3,496,370 A | 2/1970 | Haville et al. |
| 3,509,535 A | 4/1970 | Berube |
| 3,612,835 A | 10/1971 | Andrews et al. |
| 3,618,765 A | 11/1971 | Syoasel et al. |
| 3,656,615 A | 4/1972 | Ptacek |
| 3,679,314 A | 7/1972 | Mustert |

(Continued)

FOREIGN PATENT DOCUMENTS

DE 660 354 5/1938

(Continued)

OTHER PUBLICATIONS

Amiel Industries: AI-1500 'Pulsar' High Performance Sorting and Bagging Machine, 13 pages (date unknown).

(Continued)

*Primary Examiner* — Samir A Ahmed
*Assistant Examiner* — Ali Bayat
(74) *Attorney, Agent, or Firm* — Nixon Peabody LLP

(57) ABSTRACT

A currency processing system data storage arrangement is provided for a currency processing system, which includes a first controller, a communication interface, and a sensor or sensors arranged to output to the first controller raw data associated with a sensed characteristic of processed currency bills. A data storage medium defines a database for storing the raw data, and/or derivative data corresponding to statistical data associated with the raw data, received from the first controller through the communication interface. The data storage medium is accessible by the first controller and/or a second controller through the communication interface and/or another communication interface.

8 Claims, 9 Drawing Sheets

U.S. PATENT DOCUMENTS

| | | |
|---|---|---|
| 3,705,384 A | 12/1972 | Wahlberg |
| 3,715,031 A | 2/1973 | Okkonen |
| 3,725,667 A | 4/1973 | Schwartz |
| 3,764,899 A | 10/1973 | Peterson |
| 3,778,595 A | 12/1973 | Hatanaka et al. |
| 3,778,628 A | 12/1973 | Novak et al. |
| 3,782,543 A | 1/1974 | Martelli et al. |
| 3,798,603 A | 3/1974 | Wahlberg |
| 3,800,078 A | 3/1974 | Cochran et al. |
| 3,806,710 A | 4/1974 | Shigemori et al. |
| 3,815,021 A | 6/1974 | Kerr |
| 3,842,281 A | 10/1974 | Goodrich |
| 3,870,629 A | 3/1975 | Carter et al. |
| 3,906,449 A | 9/1975 | Marchak |
| 3,916,922 A | 11/1975 | Prumm |
| 3,930,582 A | 1/1976 | Gartner et al. |
| 3,966,047 A | 6/1976 | Steiner |
| 3,976,198 A | 8/1976 | Carnes, Jr. et al. |
| 3,998,237 A | 12/1976 | Kressin |
| 4,023,011 A | 5/1977 | Nakajima et al. |
| 4,041,456 A | 8/1977 | Ott et al. |
| 4,059,122 A | 11/1977 | Kinoshita |
| 4,075,460 A | 2/1978 | Gorgens |
| 4,096,991 A | 6/1978 | Iguchi |
| 4,109,238 A | 8/1978 | Creekmore |
| 4,114,804 A | 9/1978 | Jones et al. |
| 4,147,430 A | 4/1979 | Gorgone et al. |
| 4,150,740 A | 4/1979 | Douno |
| 4,166,945 A | 9/1979 | Inoyama et al. |
| 4,172,462 A | 10/1979 | Uchida et al. |
| 4,179,685 A | 12/1979 | O'Maley |
| 4,187,463 A | 2/1980 | Kivenson |
| 4,197,986 A | 4/1980 | Nagata |
| 4,205,780 A | 6/1980 | Burns et al. |
| 4,208,549 A | 6/1980 | Polillo et al. |
| 4,231,014 A | 10/1980 | Ponzio |
| 4,232,295 A | 11/1980 | McConnell |
| 4,237,378 A | 12/1980 | Jones |
| 4,249,552 A | 2/1981 | Margolin et al. |
| 4,250,806 A | 2/1981 | Boyson et al. |
| 4,251,867 A | 2/1981 | Uchida et al. |
| 4,255,651 A | 3/1981 | Phillips |
| 4,264,808 A | 4/1981 | Owens et al. |
| 4,266,121 A | 5/1981 | Hirose |
| 4,275,874 A | 6/1981 | DiBlasio |
| 4,277,774 A | 7/1981 | Fujii et al. |
| 4,283,708 A | 8/1981 | Lee |
| 4,286,703 A | 9/1981 | Schuller et al. |
| 4,288,781 A | 9/1981 | Sellner et al. |
| 4,302,781 A | 11/1981 | Ikeda et al. |
| 4,310,885 A | 1/1982 | Azcua et al. |
| 4,311,914 A | 1/1982 | Huber |
| 4,313,598 A | 2/1982 | DiBlasio |
| 4,317,957 A | 3/1982 | Sendrow |
| 4,321,672 A | 3/1982 | Braun et al. |
| 4,334,619 A | 6/1982 | Horino et al. |
| 4,337,864 A | 7/1982 | McLean |
| 4,341,951 A | 7/1982 | Benton |
| 4,348,656 A | 9/1982 | Gorgone et al. |
| 4,349,111 A | 9/1982 | Shah et al. |
| 4,352,988 A | 10/1982 | Ishida |
| 4,355,300 A | 10/1982 | Weber |
| 4,355,369 A | 10/1982 | Garvin |
| 4,356,473 A | 10/1982 | Freudenthal |
| 4,360,034 A | 11/1982 | Davila et al. |
| 4,380,316 A | 4/1983 | Glinka et al. |
| 4,381,447 A | 4/1983 | Horvath et al. |
| 4,383,540 A | 5/1983 | DeMeyer et al. |
| 4,386,432 A | 5/1983 | Nakamura et al. |
| 4,396,902 A | 8/1983 | Warthan et al. |
| 4,412,292 A | 10/1983 | Sedam et al. |
| 4,416,299 A | 11/1983 | Bergman |
| 4,420,153 A | 12/1983 | Winkler et al. |
| 4,434,359 A | 2/1984 | Watanabe |
| 4,441,205 A | 4/1984 | Berkin et al. |
| 4,442,541 A | 4/1984 | Finkel et al. |
| 4,449,240 A | 5/1984 | Yoshida |
| 4,454,414 A | 6/1984 | Benton |
| 4,461,028 A | 7/1984 | Okubo |
| 4,464,786 A | 8/1984 | Nishito et al. |
| 4,464,787 A | 8/1984 | Fish et al. |
| RE31,692 E | 10/1984 | Tyburski et al. |
| 4,480,177 A | 10/1984 | Allen |
| 4,487,306 A | 12/1984 | Nao et al. |
| 4,490,846 A | 12/1984 | Ishida et al. |
| 4,513,439 A | 4/1985 | Gorgone et al. |
| 4,521,008 A | 6/1985 | Granzow et al. |
| 4,523,087 A | 6/1985 | Benton |
| 4,530,067 A | 7/1985 | Dorr |
| 4,538,719 A | 9/1985 | Gray et al. |
| 4,539,702 A | 9/1985 | Oka |
| 4,542,829 A | 9/1985 | Emery et al. |
| 4,543,969 A | 10/1985 | Rasmussen |
| 4,544,266 A | 10/1985 | Antes |
| 4,547,896 A | 10/1985 | Ohtombe et al. |
| 4,553,222 A | 11/1985 | Kurland et al. |
| 4,553,846 A | 11/1985 | Hilton et al. |
| 4,556,140 A | 12/1985 | Okada |
| 4,558,224 A | 12/1985 | Gober |
| 4,558,711 A | 12/1985 | Yoshiaki et al. |
| 4,559,451 A | 12/1985 | Curl |
| 4,563,771 A | 1/1986 | Gorgone et al. |
| 4,567,370 A | 1/1986 | Falls |
| 4,569,421 A | 2/1986 | Sandstedt |
| 4,582,172 A | 4/1986 | Takeuchi et al. |
| 4,584,529 A | 4/1986 | Aoyama |
| 4,587,412 A | 5/1986 | Apisdorf |
| 4,587,434 A | 5/1986 | Roes et al. |
| 4,590,606 A | 5/1986 | Rohrer |
| 4,592,090 A | 5/1986 | Curl et al. |
| 4,593,184 A | 6/1986 | Bryce |
| 4,594,664 A | 6/1986 | Hashimoto |
| 4,602,332 A | 7/1986 | Hirose et al. |
| D285,095 S | 8/1986 | Lundgren et al. |
| 4,605,926 A | 8/1986 | Onishi et al. |
| 4,611,205 A | 9/1986 | Eglise |
| 4,611,345 A | 9/1986 | Ohnishi et al. |
| 4,617,458 A | 10/1986 | Bryce |
| 4,620,559 A | 11/1986 | Childers et al. |
| 4,622,456 A | 11/1986 | Naruto et al. |
| 4,628,194 A | 12/1986 | Dobbins et al. |
| 4,641,239 A | 2/1987 | Takesako |
| 4,645,936 A | 2/1987 | Gorgone |
| 4,653,647 A | 3/1987 | Hashimoto |
| 4,658,289 A | 4/1987 | Nagano et al. |
| 4,676,343 A | 6/1987 | Humble et al. |
| 4,677,682 A | 6/1987 | Miyagawa et al. |
| 4,678,072 A | 7/1987 | Kobayashi et al. |
| 4,685,141 A | 8/1987 | Hoque et al. |
| 4,686,357 A | 8/1987 | Douno et al. |
| 4,694,963 A | 9/1987 | Takesako |
| 4,697,071 A | 9/1987 | Hiraoka et al. |
| 4,700,368 A | 10/1987 | Munn et al. |
| 4,706,577 A | 11/1987 | Jones |
| 4,716,456 A | 12/1987 | Hosaka |
| 4,733,308 A | 3/1988 | Nakamura et al. |
| 4,733,765 A | 3/1988 | Watanabe |
| 4,735,289 A | 4/1988 | Kenyon |
| 4,743,743 A | 5/1988 | Fukatsu |
| 4,743,974 A | 5/1988 | Lockwood |
| 4,748,679 A | 5/1988 | Gold et al. |
| 4,749,087 A | 6/1988 | Buttifant |
| 4,753,625 A | 6/1988 | Okada |
| 4,764,725 A | 8/1988 | Bryce |
| 4,764,976 A | 8/1988 | Kallin et al. |
| 4,766,548 A | 8/1988 | Cedrone et al. |
| 4,775,353 A | 10/1988 | Childers et al. |
| 4,778,983 A | 10/1988 | Ushikubo |
| 4,782,328 A | 11/1988 | Denlinger |
| 4,784,274 A | 11/1988 | Mori et al. |
| 4,803,347 A | 2/1989 | Sugahara et al. |
| 4,804,830 A | 2/1989 | Miyagisima et al. |
| 4,806,709 A | 2/1989 | Evans |
| 4,811,004 A | 3/1989 | Person et al. |
| 4,817,176 A | 3/1989 | Marshall et al. |
| 4,821,332 A | 4/1989 | Durham |
| 4,823,393 A | 4/1989 | Kawakami |

| | | | | | | |
|---|---|---|---|---|---|---|
| 4,825,246 A | 4/1989 | Fukuchi et al. | | 5,207,788 A | 5/1993 | Geib .......................... 271/122 |
| 4,827,531 A | 5/1989 | Milford | | 5,231,381 A | 7/1993 | Duwaer |
| 4,833,307 A | 5/1989 | Gonzales/Justiz | | 5,237,158 A | 8/1993 | Kern et al. |
| 4,833,312 A | 5/1989 | Minematsu et al. | | 5,239,593 A | 8/1993 | Wittner et al. |
| 4,837,842 A | 6/1989 | Holt | | 5,243,174 A | 9/1993 | Veeneman et al. |
| 4,841,358 A | 6/1989 | Kammoto et al. | | 5,251,738 A | 10/1993 | Dabrowski |
| 4,844,369 A | 7/1989 | Kanayachi | | 5,252,167 A | 10/1993 | Yoshida et al. |
| 4,851,616 A | 7/1989 | Wales et al. | | 5,252,811 A | 10/1993 | Henochowicz et al. |
| 4,877,230 A | 10/1989 | Winkler et al. | | 5,253,167 A | 10/1993 | Yoshida et al. |
| 4,880,096 A | 11/1989 | Kobayashi et al. | | 5,261,518 A | 11/1993 | Bryce |
| 4,881,268 A | 11/1989 | Uchida et al. | | 5,265,008 A | 11/1993 | Benton et al. |
| 4,883,158 A | 11/1989 | Kobayashi et al. | | 5,279,403 A | 1/1994 | Harbaugh et al. |
| 4,883,181 A | 11/1989 | Yoshikawa | | 5,282,127 A | 1/1994 | Mii |
| 4,884,212 A | 11/1989 | Stutsman | | 5,286,954 A | 2/1994 | Sato et al. |
| 4,888,812 A | 12/1989 | Dinan et al. | | 5,291,003 A | 3/1994 | Avnet et al. |
| 4,903,953 A | 2/1990 | Winkler et al. | | 5,293,981 A | 3/1994 | Abe et al. |
| 4,905,839 A | 3/1990 | Yuge et al. | | 5,295,196 A | 3/1994 | Raterman et al. ............ 382/135 |
| 4,905,840 A | 3/1990 | Yuge et al. | | 5,297,030 A | 3/1994 | Vassigh et al. |
| 4,908,516 A | 3/1990 | West | | 5,299,977 A | 4/1994 | Mazur et al. |
| 4,921,463 A | 5/1990 | Primdahl et al. | | 5,302,811 A | 4/1994 | Fukatsu |
| 4,922,109 A | 5/1990 | Bercovitz et al. | | 5,304,813 A | 4/1994 | DeMan |
| 4,928,094 A | 5/1990 | Smith | | 5,308,992 A | 5/1994 | Crane et al. |
| 4,931,782 A | 6/1990 | Jackson | | 5,309,515 A | 5/1994 | Troung et al. |
| 4,947,441 A | 8/1990 | Hara et al. | | 5,317,140 A | 5/1994 | Dunthorn |
| 4,953,086 A | 8/1990 | Fukatsu | | 5,321,238 A | 6/1994 | Kamata et al. |
| 4,954,697 A | 9/1990 | Kokubun et al. | | 5,335,292 A | 8/1994 | Lovelady et al. |
| 4,970,655 A | 11/1990 | Winn et al. | | 5,341,408 A | 8/1994 | Melcher et al. |
| 4,973,851 A | 11/1990 | Lee | | 5,342,165 A | 8/1994 | Graef et al. |
| 4,980,543 A | 12/1990 | Hara et al. | | 5,363,949 A | 11/1994 | Matsubayashi |
| 4,988,849 A | 1/1991 | Sasaki et al. | | 5,367,577 A | 11/1994 | Gotaas |
| 4,992,860 A | 2/1991 | Hamaguchi et al. | | 5,368,147 A | 11/1994 | Menke et al. |
| 4,995,848 A | 2/1991 | Goh | | 5,371,345 A | 12/1994 | LeStrange et al. |
| 4,996,604 A | 2/1991 | Oqawa et al. | | 5,371,798 A | 12/1994 | McWhorter |
| 510,782 | 4/1991 | Asano et al. | | 5,373,550 A | 12/1994 | Campbell et al. |
| 5,010,238 A | 4/1991 | Kadono et al. | | 5,374,814 A | 12/1994 | Kako et al. |
| 5,023,782 A | 6/1991 | Lutz et al. | | 5,379,344 A | 1/1995 | Larson et al. |
| 5,025,139 A | 6/1991 | Halliburton, Jr. | | 5,381,019 A | 1/1995 | Sato |
| 5,027,415 A | 6/1991 | Hara et al. | | 5,390,776 A | 2/1995 | Thompson |
| 5,039,848 A | 8/1991 | Stoken | | 5,394,969 A | 3/1995 | Harbaugh |
| 5,040,226 A | 8/1991 | Elischer et al. | | 5,399,874 A | 3/1995 | Gonsalves et al. |
| 5,047,871 A | 9/1991 | Meyer et al. | | 5,402,895 A | 4/1995 | Mikkelsen et al. |
| 5,054,621 A | 10/1991 | Murphy et al. | | 5,417,316 A | 5/1995 | Harbaugh |
| 5,055,657 A | 10/1991 | Miller et al. | | 5,418,458 A | 5/1995 | Jeffers |
| 5,055,834 A | 10/1991 | Chiba | | 5,419,424 A | 5/1995 | Harbaugh |
| 5,063,599 A | 11/1991 | Concannon et al. | | 5,421,443 A | 6/1995 | Hatamachi et al. |
| 5,064,999 A | 11/1991 | Okamoto et al. | | 5,430,664 A | 7/1995 | Cargill et al. |
| 5,068,519 A | 11/1991 | Bryce | | 5,434,427 A | 7/1995 | Crane et al. |
| 5,076,441 A | 12/1991 | Gerlier | | 5,437,357 A | 8/1995 | Ota et al. |
| 5,080,633 A | 1/1992 | Ristvedt et al. | | 5,438,184 A | 8/1995 | Roberts et al. |
| 5,091,713 A | 2/1992 | Horne et al. | | 5,440,108 A | 8/1995 | Tran et al. |
| 5,091,961 A | 2/1992 | Baus, Jr. | | 5,444,793 A | 8/1995 | Kelland |
| 5,105,601 A | 4/1992 | Horiguchi et al. | | 5,444,794 A | 8/1995 | Uhland, Sr. |
| 5,114,381 A | 5/1992 | Ueda et al. | | 5,450,938 A | 9/1995 | Rademacher |
| 5,120,944 A | 6/1992 | Kern et al. | | 5,453,601 A | 9/1995 | Rosen |
| 5,120,945 A | 6/1992 | Nishibe et al. | | 5,459,304 A | 10/1995 | Eisenmann |
| 5,122,754 A | 6/1992 | Gotaas | | 5,465,301 A | 11/1995 | Jotcham et al. |
| 5,134,663 A | 7/1992 | Kozlowski | | 5,465,821 A | 11/1995 | Akioka |
| 5,135,115 A | 8/1992 | Miller et al. | | 5,467,405 A | 11/1995 | Raterman et al. ............ 382/135 |
| 5,140,517 A | 8/1992 | Nagata et al. | | 5,467,406 A | 11/1995 | Graves et al. ................ 382/135 |
| 5,144,115 A | 9/1992 | Yoshida | | 5,468,971 A | 11/1995 | Ebstein et al. |
| 5,146,067 A | 9/1992 | Sloan et al. | | 5,470,079 A | 11/1995 | LeStrange et al. |
| 5,146,512 A | 9/1992 | Weideman et al. | | 5,476,169 A | 12/1995 | Takarada et al. |
| 5,151,607 A | 9/1992 | Crane | | 5,481,377 A | 1/1996 | Udagawa et al. |
| 5,154,272 A | 10/1992 | Nishiumi et al. | | 5,486,067 A | 1/1996 | Huynh et al. |
| 5,159,548 A | 10/1992 | Caslavka | | 5,488,671 A | 1/1996 | Kern |
| 5,163,672 A | 11/1992 | Mennie ........................ 271/187 | | 5,500,514 A | 3/1996 | Veeneman et al. |
| 5,163,868 A | 11/1992 | Adams et al. | | 5,504,822 A | 4/1996 | Holt |
| 5,167,313 A | 12/1992 | Dobbins et al. | | 5,506,691 A | 4/1996 | Bednar et al. |
| 5,175,416 A | 12/1992 | Mansvelt et al. | | 5,507,379 A | 4/1996 | Mazur et al. |
| 5,179,517 A | 1/1993 | Sarbin et al. | | D369,984 S | 5/1996 | Larsen .......................... D10/97 |
| 5,183,142 A | 2/1993 | Katchinian et al. | | 5,523,575 A | 6/1996 | Machida et al. |
| 5,184,115 A | 2/1993 | Black et al. | | 5,530,772 A | 6/1996 | Storey |
| 5,184,709 A | 2/1993 | Nishiumi et al. | | 5,537,486 A | 7/1996 | Stratigos et al. |
| 5,186,334 A | 2/1993 | Fukudome et al. | | 5,544,043 A | 8/1996 | Miki et al. |
| 5,187,750 A | 2/1993 | Behera | | 5,544,086 A | 8/1996 | Davis et al. |
| 5,193,121 A | 3/1993 | Elischer et al. | | 5,545,885 A | 8/1996 | Jagielinski |
| 5,198,976 A | 3/1993 | Form et al. | | 5,553,320 A | 9/1996 | Matsuura et al. |
| 5,199,543 A | 4/1993 | Kamagami et al. | | 5,559,887 A | 9/1996 | Davis et al. |
| 5,201,395 A | 4/1993 | Takizawa et al. | | 5,564,546 A | 10/1996 | Molbak et al. |

| | | | | | | |
|---|---|---|---|---|---|---|
| 5,586,036 A | 12/1996 | Pintsov | | 6,023,684 A | 2/2000 | Pearson |
| 5,592,377 A | 1/1997 | Lipkin | | 6,026,175 A | 2/2000 | Raterman et al. ............ 382/135 |
| 5,600,732 A | 2/1997 | Ott et al. | | 6,028,951 A | 2/2000 | Raterman et al. ............ 382/135 |
| 5,602,933 A | 2/1997 | Blackwell et al. | | D422,016 S | 3/2000 | Forslund |
| 5,602,936 A | 2/1997 | Green et al. | | 6,032,859 A | 3/2000 | Muehlberger et al. |
| 5,607,040 A | 3/1997 | Mathurin, Sr. | | 6,038,553 A | 3/2000 | Hyde, Jr. |
| 5,615,280 A | 3/1997 | Izawa et al. | | 6,039,645 A | 3/2000 | Mazur |
| 5,620,079 A | 4/1997 | Molbak | | 6,047,807 A | 4/2000 | Molbak |
| 5,623,427 A | 4/1997 | Jones et al. | | 6,047,808 A | 4/2000 | Neubarth et al. |
| 5,625,562 A | 4/1997 | Veeneman et al. | | 6,056,104 A | 5/2000 | Neubarth et al. |
| 5,633,949 A | 5/1997 | Graves et al. ............... 382/135 | | 6,068,194 A | 5/2000 | Mazur .......................... 235/492 |
| 5,637,845 A | 6/1997 | Kolls | | 6,072,896 A | 6/2000 | Graves et al. ................ 382/135 |
| 5,640,463 A | 6/1997 | Csulits .......................... 382/135 | | 6,073,744 A | 6/2000 | Raterman et al. ............ 194/207 |
| 5,641,050 A | 6/1997 | Smith et al. | | 6,074,334 A | 6/2000 | Mennie et al. ................ 493/438 |
| 5,650,605 A | 7/1997 | Morioka et al. | | 6,080,056 A | 6/2000 | Karlsson |
| 5,652,421 A | 7/1997 | Veeneman et al. | | D427,623 S | 7/2000 | Kuwada et al. |
| 5,652,802 A | 7/1997 | Graves et al. ............... 382/135 | | 6,082,519 A | 7/2000 | Martin et al. |
| 5,657,846 A | 8/1997 | Schwartz | | 6,086,471 A | 7/2000 | Zimmermann |
| 5,665,952 A | 9/1997 | Ziarno | | 6,095,313 A | 8/2000 | Molbak et al. |
| 5,678,046 A | 10/1997 | Cahill et al. | | 6,116,402 A | 9/2000 | Beach et al. |
| 5,680,472 A | 10/1997 | Conant | | 6,128,402 A | 10/2000 | Jones et al. .................. 382/135 |
| 5,687,963 A | 11/1997 | Mennie .......................... 271/119 | | 6,145,738 A | 11/2000 | Stinson et al. |
| 5,692,067 A | 11/1997 | Raterman et al. ............ 382/135 | | 6,220,419 B1 | 4/2001 | Mennie .......................... 194/207 |
| 5,704,491 A | 1/1998 | Graves .......................... 209/534 | | 6,230,928 B1 | 5/2001 | Hanna et al. |
| 5,719,948 A | 2/1998 | Liang | | 6,237,565 B1 | 5/2001 | Engelgau |
| 5,724,438 A | 3/1998 | Graves .......................... 382/135 | | 6,237,739 B1 | 5/2001 | Mazur et al. .................. 194/207 |
| 5,727,667 A | 3/1998 | Nye | | 6,241,069 B1 | 6/2001 | Mazur et al. .................. 194/207 |
| 5,729,623 A | 3/1998 | Omatu et al. | | 6,256,407 B1 | 7/2001 | Mennie et al. ................ 382/135 |
| 5,746,299 A | 5/1998 | Molbak et al. | | 6,278,795 B1 | 8/2001 | Anderson et al. ............ 382/135 |
| 5,751,840 A | 5/1998 | Raterman et al. ............ 382/135 | | 6,283,366 B1 | 9/2001 | Hills et al. |
| 5,751,842 A | 5/1998 | Riach et al. | | 6,308,887 B1 | 10/2001 | Korman et al. |
| 5,754,673 A | 5/1998 | Brooks et al. | | 6,311,819 B1 | 11/2001 | Stromme et al. ............. 194/207 |
| 5,761,089 A | 6/1998 | Mcinerny | | 6,318,536 B1 | 11/2001 | Korman et al. |
| 5,774,874 A | 6/1998 | Veeneman et al. | | 6,318,537 B1 | 11/2001 | Jones et al. .................. 194/346 |
| 5,781,654 A | 7/1998 | Carney | | 6,351,551 B1 | 2/2002 | Munro et al. ................. 382/135 |
| 5,790,693 A | 8/1998 | Graves et al. ............... 382/135 | | 6,354,491 B2 | 3/2002 | Nichols et al. |
| 5,790,697 A | 8/1998 | Munro et al. ................. 382/135 | | 6,363,164 B1 | 3/2002 | Jones et al. .................. 382/135 |
| 5,799,767 A | 9/1998 | Molbak | | 6,371,303 B1 | 4/2002 | Klein et al. ................... 209/534 |
| 5,806,650 A | 9/1998 | Mennie et al. ................ 194/206 | | 6,378,683 B1 | 4/2002 | Mennie .......................... 194/207 |
| 5,813,510 A | 9/1998 | Rademacher | | 6,381,354 B1 | 4/2002 | Mennie et al. ................ 382/135 |
| 5,815,592 A | 9/1998 | Mennie et al. ................ 382/135 | | 6,398,000 B1 | 6/2002 | Jenrick et al. ................. 194/200 |
| 5,822,448 A | 10/1998 | Graves et al. ............... 382/135 | | 6,438,230 B1 | 8/2002 | Moore |
| 5,830,054 A | 11/1998 | Petri | | 6,459,806 B1 | 10/2002 | Raterman et al. ............ 382/135 |
| 5,832,104 A | 11/1998 | Graves et al. ............... 382/135 | | 6,460,705 B1 | 10/2002 | Hallowell ..................... 209/534 |
| 5,832,463 A | 11/1998 | Funk | | 6,473,519 B1 | 10/2002 | Pidhirny et al. |
| 5,842,188 A | 11/1998 | Ramsey et al. | | 6,474,548 B1 | 11/2002 | Montross et al. |
| 5,842,916 A | 12/1998 | Gerrity et al. | | 6,493,461 B1 | 12/2002 | Mennie et al. ................ 382/135 |
| 5,850,076 A | 12/1998 | Morioka et al. | | 6,539,104 B1 | 3/2003 | Raterman et al. ............ 382/135 |
| 5,852,811 A | 12/1998 | Atkins | | 6,554,185 B1 | 4/2003 | Montross et al. |
| 5,854,581 A | 12/1998 | Mori et al. | | 6,560,355 B2 | 5/2003 | Graves et al. ................ 382/135 |
| 5,867,589 A | 2/1999 | Graves et al. ............... 382/135 | | 6,588,569 B1 | 7/2003 | Jenrick et al. ................. 194/206 |
| 5,870,487 A | 2/1999 | Graves et al. ............... 382/135 | | 6,601,687 B1 | 8/2003 | Jenrick et al. ................. 194/206 |
| 5,875,259 A | 2/1999 | Mennie et al. ................ 382/135 | | 6,603,872 B2 | 8/2003 | Jones et al. .................. 382/135 |
| 5,880,444 A | 3/1999 | Shibata et al. | | 6,621,919 B2 | 9/2003 | Mennie et al. ................ 382/135 |
| 5,892,211 A | 4/1999 | Davis et al. | | 6,628,816 B2 | 9/2003 | Mennie et al. ................ 382/135 |
| 5,905,810 A | 5/1999 | Jones et al. .................. 382/135 | | 6,636,624 B2 | 10/2003 | Raterman et al. ............ 382/135 |
| 5,909,502 A | 6/1999 | Mazur ........................... 382/135 | | 6,647,136 B2 | 11/2003 | Jones et al. .................. 382/137 |
| 5,909,503 A | 6/1999 | Graves et al. ............... 382/135 | | 6,650,767 B2 | 11/2003 | Jones et al. .................. 382/135 |
| 5,909,793 A | 6/1999 | Beach et al. | | 6,654,486 B2 | 11/2003 | Jones et al. .................. 382/135 |
| 5,909,794 A | 6/1999 | Molbak et al. | | 6,661,910 B2 | 12/2003 | Jones et al. .................. 382/135 |
| 5,912,982 A | 6/1999 | Munro et al. ................. 382/135 | | 6,665,431 B2 | 12/2003 | Jones et al. .................. 382/135 |
| 5,918,748 A | 7/1999 | Clark et al. | | 6,678,401 B2 | 1/2004 | Jones et al. .................. 382/135 |
| 5,926,550 A | 7/1999 | Davis | | 6,678,402 B2 | 1/2004 | Jones et al. .................. 382/135 |
| 5,938,044 A | 8/1999 | Weggesser .................... 209/534 | | 6,705,470 B2 | 3/2004 | Klein et al. ................... 209/534 |
| 5,940,623 A | 8/1999 | Watts et al. | | 6,721,442 B1 | 4/2004 | Mennie et al. ................ 382/135 |
| 5,940,844 A | 8/1999 | Cahill et al. | | 6,724,926 B2 | 4/2004 | Jones et al. .................. 382/135 |
| 5,943,655 A | 8/1999 | Jacobson ....................... 705/30 | | 6,724,927 B2 | 4/2004 | Jones et al. .................. 382/135 |
| 5,944,600 A | 8/1999 | Zimmermann | | 6,731,785 B1 | 5/2004 | Mennie et al. ................ 382/135 |
| 5,947,255 A | 9/1999 | Shimada et al. | | 6,731,786 B2 | 5/2004 | Jones et al. .................. 382/135 |
| 5,957,262 A | 9/1999 | Molbak et al. | | 6,748,101 B1 | 6/2004 | Jones et al. .................. 382/135 |
| 5,960,103 A | 9/1999 | Graves et al. ............... 382/135 | | 6,758,316 B2 | 7/2004 | Molbak |
| 5,966,456 A | 10/1999 | Jones et al. .................. 382/135 | | 6,778,693 B2 | 8/2004 | Jones et al. .................. 382/135 |
| 5,982,918 A | 11/1999 | Mennie et al. ................ 382/135 | | 6,782,986 B2 * | 8/2004 | Toda et al. .................... 194/206 |
| 5,988,348 A | 11/1999 | Martin et al. | | 6,783,452 B2 | 8/2004 | Hino et al. |
| 5,992,601 A | 11/1999 | Mennie et al. ................ 194/207 | | 6,783,785 B1 | 8/2004 | Hino et al. |
| 5,995,949 A | 11/1999 | Morioka et al. | | 6,786,398 B1 | 9/2004 | Stinson et al. |
| 6,012,565 A | 1/2000 | Mazur ........................... 194/207 | | 6,798,899 B2 | 9/2004 | Mennie et al. ................ 382/135 |
| 6,017,270 A | 1/2000 | Ristvedt et al. | | 6,810,137 B2 | 10/2004 | Jones et al. .................. 382/135 |
| 6,021,883 A | 2/2000 | Casanova et al. ............. 194/217 | | 6,843,418 B2 | 1/2005 | Jones et al. ............. 235/462.01 |

| | | | | | | |
|---|---|---|---|---|---|---|
| 6,860,375 B2 | 3/2005 | Hallowell et al. .............. 194/328 | | 2003/0168308 A1 | 9/2003 | Maier et al. .................... 194/207 |
| 6,866,134 B2 | 3/2005 | Stromme et al. ................ 194/207 | | 2003/0174874 A1 | 9/2003 | Raterman et al. .............. 382/135 |
| 6,868,954 B2 | 3/2005 | Stromme et al. ................ 194/207 | | 2003/0182217 A1 | 9/2003 | Chiles ............................. 705/35 |
| 6,880,692 B1 | 4/2005 | Mazur et al. .................... 194/207 | | 2003/0198373 A1 | 10/2003 | Raterman et al. .............. 382/135 |
| 6,913,130 B1 | 7/2005 | Mazur et al. .................... 194/207 | | 2003/0202690 A1 | 10/2003 | Jones et al. ..................... 382/139 |
| 6,913,260 B2 | 7/2005 | Maier et al. .............. 271/265.04 | | 2004/0003980 A1 | 1/2004 | Hallowell et al. .............. 194/206 |
| 6,915,893 B2 | 7/2005 | Mennie ........................... 194/207 | | 2004/0016621 A1 | 1/2004 | Jenrick et al. .................. 194/206 |
| 6,929,109 B1 | 8/2005 | Klein et al. ..................... 194/206 | | 2004/0016797 A1 | 1/2004 | Jones et al. ..................... 235/379 |
| 6,955,253 B1 | 10/2005 | Mazur et al. .................... 194/207 | | 2004/0028266 A1 | 2/2004 | Jones et al. ..................... 382/135 |
| 6,957,733 B2 | 10/2005 | Mazur et al. .................... 194/215 | | 2004/0083149 A1 | 4/2004 | Jones ............................... 705/35 |
| 6,959,800 B1 | 11/2005 | Mazur et al. .................... 194/207 | | 2004/0145726 A1 | 7/2004 | Csulits et al. ..................... 356/71 |
| 6,962,247 B2 | 11/2005 | Maier et al. ..................... 194/207 | | 2004/0149538 A1 | 8/2004 | Sakowski ........................ 194/207 |
| 6,980,684 B1 | 12/2005 | Munro et al. .................... 382/135 | | 2004/0153408 A1 | 8/2004 | Jones et al. ....................... 705/43 |
| 6,991,530 B2 | 1/2006 | Hino et al. | | 2004/0154964 A1 | 8/2004 | Jones .............................. 209/534 |
| 6,994,200 B2 | 2/2006 | Jenrick et al. .................. 194/206 | | 2004/0173432 A1 | 9/2004 | Jones ............................... 194/216 |
| 6,996,263 B2 | 2/2006 | Jones et al. ..................... 382/135 | | 2004/0188221 A1 | 9/2004 | Carter |
| 7,000,828 B2 | 2/2006 | Jones ............................... 235/379 | | 2004/0251110 A1 | 12/2004 | Jenrick et al. .................. 194/207 |
| 7,004,831 B2 | 2/2006 | Hino et al. | | 2005/0029168 A1 | 2/2005 | Jones et al. ..................... 209/534 |
| 7,016,767 B2 | 3/2006 | Jones et al. ..................... 700/224 | | 2005/0035034 A1 | 2/2005 | Long et al. ..................... 209/534 |
| 7,028,827 B1 | 4/2006 | Molbak et al. | | 2005/0040225 A1 | 2/2005 | Csulits et al. .................. 235/379 |
| 7,082,216 B2 | 7/2006 | Jones et al. ..................... 382/137 | | 2005/0047642 A1 | 3/2005 | Jones et al. ..................... 382/137 |
| 7,092,560 B2 * | 8/2006 | Jones et al. ..................... 382/135 | | 2005/0060055 A1 | 3/2005 | Hallowell et al. ................ 700/95 |
| 7,103,206 B2 * | 9/2006 | Graves et al. ................... 382/135 | | 2005/0060059 A1 | 3/2005 | Klein et al. ..................... 700/213 |
| 7,103,438 B2 | 9/2006 | Hallowell et al. .............. 700/116 | | 2005/0060061 A1 | 3/2005 | Jones .............................. 700/226 |
| 7,113,929 B1 | 9/2006 | Beach et al. | | 2005/0077142 A1 | 4/2005 | Tam et al. ....................... 194/217 |
| 7,146,245 B2 | 12/2006 | Jones et al. ..................... 700/224 | | 2005/0086271 A1 | 4/2005 | Jones et al. ..................... 707/200 |
| 7,149,336 B2 | 12/2006 | Jones et al. ..................... 382/135 | | 2005/0087422 A1 | 4/2005 | Maier et al. ..................... 194/207 |
| 7,158,662 B2 | 1/2007 | Chiles ............................. 382/135 | | 2005/0108165 A1 | 5/2005 | Jones et al. ....................... 705/43 |
| 7,171,032 B2 | 1/2007 | Jones et al. ..................... 382/135 | | 2005/0117791 A2 | 6/2005 | Raterman et al. .............. 382/135 |
| 7,187,795 B2 | 3/2007 | Jones et al. ..................... 382/135 | | 2005/0117792 A1 | 6/2005 | Graves et al. .................. 382/135 |
| 7,191,657 B2 | 3/2007 | Maier et al. ....................... 73/587 | | 2005/0150738 A1 | 7/2005 | Hallowell et al. .............. 194/206 |
| 7,197,173 B2 | 3/2007 | Jones et al. ..................... 382/135 | | 2005/0163361 A1 | 7/2005 | Jones et al. ..................... 382/135 |
| 7,200,255 B2 | 4/2007 | Jones et al. ..................... 382/135 | | 2005/0163362 A1 | 7/2005 | Jones et al. ..................... 382/137 |
| 7,201,320 B2 | 4/2007 | Csulits et al. ............. 235/462.01 | | 2005/0169511 A1 | 8/2005 | Jones .............................. 382/135 |
| 7,232,024 B2 | 6/2007 | Mazur et al. .................... 194/207 | | 2005/0173221 A1 | 8/2005 | Maier et al. ..................... 194/207 |
| 7,248,731 B2 | 7/2007 | Raterman et al. .............. 382/135 | | 2005/0183928 A1 | 8/2005 | Jones et al. ..................... 194/207 |
| 7,256,874 B2 | 8/2007 | Csulits et al. ..................... 356/71 | | 2005/0207634 A1 | 9/2005 | Jones et al. ..................... 382/135 |
| 7,269,279 B2 | 9/2007 | Chiles ............................. 382/135 | | 2005/0213803 A1 | 9/2005 | Mennie et al. .................. 382/135 |
| 7,349,566 B2 | 3/2008 | Jones et al. | | 2005/0241909 A1 | 11/2005 | Mazur et al. .................... 194/207 |
| 7,580,859 B2 | 8/2009 | Economy | | 2005/0249394 A1 | 11/2005 | Jones et al. ..................... 382/135 |
| 2001/0006556 A1 * | 7/2001 | Graves et al. ................... 382/135 | | 2005/0256792 A1 | 11/2005 | Shimizu et al. |
| 2001/0006557 A1 | 7/2001 | Mennie et al. .................. 382/135 | | 2005/0265591 A1 | 12/2005 | Jones et al. ..................... 382/135 |
| 2001/0015311 A1 | 8/2001 | Mennie ........................... 194/207 | | 2005/0276458 A1 | 12/2005 | Jones et al. ..................... 382/135 |
| 2001/0019624 A1 | 9/2001 | Raterman et al. .............. 382/135 | | 2005/0278239 A1 | 12/2005 | Jones et al. ....................... 705/35 |
| 2001/0035603 A1 | 11/2001 | Graves et al. ............. 271/265.01 | | 2006/0010071 A1 | 1/2006 | Jones et al. ....................... 705/42 |
| 2002/0001393 A1 | 1/2002 | Jones et al. ..................... 382/100 | | 2006/0054455 A1 | 3/2006 | Kuykendall et al. ........... 194/217 |
| 2002/0020603 A1 | 2/2002 | Jones et al. ..................... 194/346 | | 2006/0054457 A1 | 3/2006 | Long et al. |
| 2002/0056605 A1 | 5/2002 | Mazur et al. .................... 194/207 | | 2006/0064379 A1 | 3/2006 | Doran et al. |
| 2002/0085245 A1 | 7/2002 | Mennie et al. .................. 358/498 | | 2006/0078186 A1 | 4/2006 | Freeman et al. ................ 382/135 |
| 2002/0085745 A1 | 7/2002 | Jones et al. ..................... 382/135 | | 2006/0149415 A1 | 7/2006 | Richards |
| 2002/0103757 A1 | 8/2002 | Jones et al. ....................... 705/45 | | 2006/0182330 A1 | 8/2006 | Chiles ............................. 382/135 |
| 2002/0104785 A1 | 8/2002 | Klein et al. ..................... 209/534 | | 2006/0195567 A1 | 8/2006 | Mody et al. .................... 709/224 |
| 2002/0107801 A1 | 8/2002 | Jones et al. ....................... 705/45 | | 2006/0205481 A1 | 9/2006 | Dominelli |
| 2002/0118871 A1 | 8/2002 | Jones et al. ..................... 382/137 | | 2006/0207856 A1 | 9/2006 | Dean et al. |
| 2002/0122580 A1 | 9/2002 | Jones et al. ..................... 382/137 | | 2006/0210137 A1 | 9/2006 | Raterman et al. .............. 382/135 |
| 2002/0126885 A1 | 9/2002 | Mennie et al. .................. 382/135 | | 2006/0274929 A1 | 12/2006 | Jones et al. ..................... 382/135 |
| 2002/0126886 A1 | 9/2002 | Jones et al. ..................... 382/135 | | 2006/0283685 A1 | 12/2006 | Cousin |
| 2002/0131630 A1 | 9/2002 | Jones et al. ..................... 382/137 | | 2007/0071302 A1 | 3/2007 | Jones et al. |
| 2002/0136442 A1 | 9/2002 | Jones et al. ..................... 382/135 | | 2007/0076939 A1 | 4/2007 | Jones et al. ..................... 382/135 |
| 2002/0145035 A1 | 10/2002 | Jones ............................... 235/379 | | 2007/0078560 A1 | 4/2007 | Jones et al. ..................... 700/224 |
| 2002/0154804 A1 | 10/2002 | Jones et al. ..................... 382/135 | | 2007/0095630 A1 | 5/2007 | Mennie et al. .................. 194/206 |
| 2002/0154805 A1 | 10/2002 | Jones et al. ..................... 382/135 | | 2007/0112674 A1 | 5/2007 | Jones et al. ....................... 705/45 |
| 2002/0154806 A1 | 10/2002 | Jones et al. ..................... 382/135 | | 2007/0122023 A1 | 5/2007 | Jenrick et al. .................. 382/135 |
| 2002/0154807 A1 | 10/2002 | Jones et al. ..................... 382/135 | | 2007/0172107 A1 | 7/2007 | Jones et al. ..................... 382/137 |
| 2002/0154808 A1 | 10/2002 | Jones et al. ..................... 382/135 | | 2007/0221470 A1 | 9/2007 | Mennie et al. |
| 2002/0179401 A1 | 12/2002 | Knox et al. | | 2007/0237381 A1 | 10/2007 | Mennie et al. |
| 2002/0186876 A1 | 12/2002 | Jones et al. ..................... 382/135 | | 2009/0148027 A1 * | 6/2009 | Paraskevakos ................. 382/135 |
| 2003/0009420 A1 | 1/2003 | Jones ............................... 705/39 | | | | |
| 2003/0015395 A1 | 1/2003 | Hallowell et al. .............. 194/206 | | FOREIGN PATENT DOCUMENTS | | |
| 2003/0015396 A1 | 1/2003 | Mennie ........................... 194/206 | | DE | 30 21 327 | 12/1981 |
| 2003/0059098 A1 | 3/2003 | Jones et al. ..................... 382/135 | | EP | 0 109 743 | 5/1984 |
| 2003/0062242 A1 | 4/2003 | Hallowell et al. .............. 194/302 | | EP | 0 351 217 | 1/1990 |
| 2003/0081824 A1 | 5/2003 | Mennie et al. .................. 382/135 | | EP | 0 583 526 | 2/1994 |
| 2003/0108233 A1 | 6/2003 | Raterman et al. .............. 382/135 | | EP | 0 583 723 | 2/1994 |
| 2003/0121752 A1 | 7/2003 | Stromme et al. ................ 194/207 | | EP | 0 613 107 | 8/1994 |
| 2003/0121753 A1 | 7/2003 | Stromme et al. ................ 194/207 | | EP | 0 633 552 | 1/1995 |
| 2003/0127299 A1 | 7/2003 | Jones et al. | | EP | 0 667 973 | 1/1997 |
| 2003/0132281 A1 | 7/2003 | Jones et al. ..................... 235/379 | | EP | 0 926 634 | 6/1999 |
| 2003/0139994 A1 | 7/2003 | Jones ............................... 705/36 | | EP | 1 209 639 | 5/2002 |

| | | |
|---|---|---|
| FR | 2042254 | 2/1971 |
| GB | 2 035 642 | 6/1980 |
| GB | 2 038 063 | 7/1980 |
| GB | 2 175 427 | 11/1986 |
| GB | 2 190 996 | 12/1987 |
| GB | 2 198 274 | 6/1988 |
| GB | 2 223 872 | 4/1990 |
| JP | 49/58899 | 6/1974 |
| JP | 50/158343 | 12/1975 |
| JP | 52/014495 | 2/1977 |
| JP | 52/71300 | 6/1977 |
| JP | 56/40992 | 4/1981 |
| JP | 57/117080 | 7/1982 |
| JP | 59/79392 | 8/1984 |
| JP | 62/134168 | 8/1987 |
| JP | 62/221773 | 9/1987 |
| JP | 62/166562 | 10/1987 |
| JP | 64/067698 | 3/1989 |
| JP | 01/118995 | 5/1989 |
| JP | 1/307891 | 12/1989 |
| JP | 02/050793 | 2/1990 |
| JP | 02/252096 | 10/1990 |
| JP | 03/012776 | 1/1991 |
| JP | 3/63795 | 3/1991 |
| JP | 3/92994 | 4/1991 |
| JP | 03/156673 | 7/1991 |
| JP | 04/085695 | 3/1992 |
| JP | 41/75993 | 6/1992 |
| JP | 05/274527 | 10/1993 |
| JP | 06/035946 | 2/1994 |
| JP | 61/03285 | 4/1994 |
| JP | 2002/117439 | 4/2002 |
| JP | 2003/242287 | 8/2003 |
| SE | 44 244 | 9/1988 |
| WO | WO 85/00909 | 2/1985 |
| WO | WO 90/07165 | 6/1990 |
| WO | WO 91/11778 | 8/1991 |
| WO | WO 92/17394 | 10/1992 |
| WO | WO 93/09621 | 5/1993 |
| WO | WO 93/23824 | 11/1993 |
| WO | WO 94/06101 | 3/1994 |
| WO | WO 95/24691 | 9/1995 |
| WO | WO 96/10800 | 4/1996 |
| WO | WO 96/36933 | 11/1996 |
| WO | WO 97/30422 | 8/1997 |
| WO | WO 97/43734 | 11/1997 |
| WO | WO 97/45810 | 12/1997 |
| WO | WO 98/12662 | 3/1998 |
| WO | WO 98/13785 | 4/1998 |
| WO | WO 98/24041 | 6/1998 |
| WO | WO 98/24052 | 6/1998 |
| WO | WO 98/24067 | 6/1998 |
| WO | WO 98/35323 | 8/1998 |
| WO | WO 98/40839 | 9/1998 |
| WO | WO 98/47100 | 10/1998 |
| WO | WO 98/48383 | 10/1998 |
| WO | WO 98/48384 | 10/1998 |
| WO | WO 98/48385 | 10/1998 |
| WO | WO 98/50892 | 11/1998 |
| WO | WO 98/51082 | 11/1998 |
| WO | WO 98/59323 | 12/1998 |
| WO | WO 99/00776 | 1/1999 |
| WO | WO 99/09511 | 2/1999 |
| WO | WO 99/14668 | 3/1999 |
| WO | WO 99/23601 | 5/1999 |
| WO | WO 99/33030 | 7/1999 |
| WO | WO 99/41695 | 8/1999 |
| WO | WO 99/48040 | 9/1999 |
| WO | WO 99/48042 | 9/1999 |
| WO | WO 00/24572 | 5/2000 |
| WO | WO 01/08108 | 2/2001 |
| WO | WO 01/59685 | 8/2001 |
| WO | WO 01/59723 | 8/2001 |
| WO | WO 02/29735 | 4/2002 |
| WO | WO 02/054360 | 7/2002 |
| WO | WO 03/005312 | 1/2003 |
| WO | WO 03/028361 | 4/2003 |
| WO | WO 03/029913 | 4/2003 |
| WO | WO 03/030113 | 4/2003 |
| WO | WO 03/052700 | 6/2003 |
| WO | WO 03/067532 | 8/2003 |
| WO | WO 03/107282 | 12/2003 |
| WO | WO 2004/010367 | 1/2004 |
| WO | WO 2004/027717 | 4/2004 |
| WO | WO 2004/036508 | 4/2004 |
| WO | WO 2004/038631 | 5/2004 |
| WO | WO 2004/068422 | 8/2004 |
| WO | WO 2004/109464 | 12/2004 |
| WO | WO 2005/013209 A2 | 2/2005 |
| WO | WO 2005/017842 A1 | 2/2005 |
| WO | WO 2005/028348 A2 | 3/2005 |
| WO | WO 2005/029240 A2 | 3/2005 |
| WO | WO 2005/036445 A1 | 4/2005 |
| WO | WO 2005/076229 A1 | 8/2005 |
| WO | WO 2006/039439 A2 | 4/2006 |
| WO | WO 2006/076289 A2 | 7/2006 |
| WO | WO 2006/076634 A2 | 7/2006 |
| WO | WO 2007/035420 | 3/2007 |

OTHER PUBLICATIONS

AUI: Coinverter—"No More Lines . . . Self- Serve Cash-Out," by Cassius Elston, 1995 World Games Congress/Exposition Converter, 1 page (dated prior to 1995).
Brandt: System 930 Electric Counter/Sorter, 1 page (date unknown).
Brandt: 95 Series Coin Sorter Counter, 2 pages (1982).
Brandt: Mach 7 High-Speed Coin Sorter/Counter, 2 pages (1992).
Brandt: Model 1205 Coin Sorter Counter, 2 pages (1986).
Brandt: Model 1400 Coin Sorter/Counter, 2 pages (date unknown).
Brandt: Model 817 Automated Coin And Currency Ordering System, 2 pages (1983).
Brandt: Model 8904 Upfeed,- High Speed 4-Denomination Currency Dispenser, 2 pages (1989).
Brandt: Model 920/925 Counter, 2 pages (1982).
Brandt: Model 940-6 High Speed Sorter/Counter, 2 pages (date unknown).
Brandt: Model 952 Coin Sorter/Counter, 2 pages (date unknown).
Brandt: Model 954 Coin Sorter/Counter, 2 pages (date unknown).
Brandt: Model 957 Coin Sorter/Counter, 2 pages (date unknown).
Brandt: Model 958 Coin Sorter/Counter, 5 pages (© 1982).
Brandt: Model 960 High-Speed Coin Sorter & Counter, 2 pages (1984).
Brandt: Model 970 Coin Sorter and Counter, 2 pages (1983).
Brandt: System 945 High Speed Sorter, 2 pages (date unknown).
Brandt; Model 966 Microsort™ Coin Sorter and Counter, 4 pages, (1979).
Case ICC Limited: CDS Automated Receipt Giving Cash Deposit System, 3 pages (date unknown).
Cash, Martin: Newspaper Article "Bank Blends New Technology With Service," Winnipeg Free Press, 1 page (Sep. 4, 1992).
Childers Corporation: Computerized Sorter/Counter, "To coin an old adage, time is money . . . ,"3 pages (1981).
CTCoin: CDS602 Cash Deposit System, 1 page (date unknown).
Cummins: Jetsort Automated Money Processing System Vendors Love Jetsort 1 page (date unknown).
Cummins: JetSort Model 1760 Coin Sorter Counter 1page (date unknown).
Cummins: JetSort® Models 1770 and 3000, Communication Package specification and operating instructions, 10 pages (date unknown).
Cummins: JetSort® Model 1701 With Jetstops Coinsorter Operating Instructions Manual (© 1984), 16 pages.
Cummins: JetSort Model CA700-01 Coin Sorter Counter Operating Instructions (© 1982), 14 pages.
Cummins: Jetsort Model 3000 Series Options Talking Jetsort 3000 1page (date unknown).
Cummins: JetSort® Model CA-750 Coin Sorter/Counter and CA-4050 JetCount currency counter, "Money Processing Made Easy," 2 pages (date unknown).
Cummins: The Universal Solution to All Coin and Currency Processing Needs (Form 13C1218 3-83), 1 page (date unknown).
Cummins: Jetsort Time For A Change—Be A Smashing Success 1 page, (date unknown).

Cummins: Jetsort Time For A Change—JetSort® vs Brandt X, 1 page, (date unknown).
Cummins: Jetsort, Time For A Change—No Coins Sorted After 3:00 or on Saturday, 1 page (date unknown).
Cummins: Jetsort, What do all these Banks have in Common, 3 pages (date unknown).
Cummins: JetSort® 700-01, Cummins Automated Money Systems (AMS) Case Study—First State Bank of Oregon, "JetSort® Gives Bank Coin Service Edge," 2 pages (date unknown).
Cummins: JetSort® 701, Cummins Automated Money Systems (AMS) Case Study—Convenco Vending, "High Speed Coin Sorter increases [] processing power at Convenco Vending," 1 page (date unknown).
Cummins: Jetsort Model 3200, Enhanced Elecrtronics for Jetsort 3200, 1page, (date unknown).
Cummins: JetSort® High Speed Coin Sorter &Counter, "CTOCS Ready" (Form 023-1365), 2 pages (date unknown).
Cummins: JetSort Model 3000, Sorts Counts 3000 Mixed Coins Per Min, 1page, (date unknown).
Cummins: JetSort® Model 1770, "JetSort® Speed and Accuracy, Now with Communications!", (Form 023-1272) 1 page (date unknown).
Cummins: JetSort® 700-01/CA-118 Coin Wrapper, Cummins Automated Money Systems (AMS) Case Study—University State Bank, "Cummins Money Processing System Boosts Teller Service at University State Bank," 2 pages (date unknown).
Cummins: Jetsort Model CA130XL Case Study Coin Sorter Counter Keeps Pace With Fith Third Bank, 2pages (date unknown).
Cummins: Jetsort One Moving Part Simplicity Vendors Are Validators Changing Your Coin/Currency 3pages (date unknown).
Cummins: JetSort Model Series V, High Speed Coin Sorter Counter, 2pages (date unknown).
Cummins: JetSort Models 701 and 750 , "State-of-the-art coin processing comes of age," 2 pages (Feb. 1984).
Cummins: Jetsort Cash Information and Settlement Systems 4pages, (date unknown).
Cummins: Jetsort Model CA 750 JetSort Coin Processor, 1page (date unknown).
Cummins: Jetsort Model 2000 Series JetSort High speed Coin Sorters, 2pages (date unknown).
Cummins: Jetsort Model 3000 Series High Speed Coin Counter 2page, (date unknown).
Cummins: JetSort® High Speed Sorter/Counter Kits I & J—Operating Instructions (Form 022-7123-00) 12 pages.
De La Rue: CDS 500 Cash Deponier System, 6 pages (date unknown) (German).
De La Rue: CDS 5700 and CDS 5800 Cash Deponier System, 7 pages (date unknown) (German) and translation.
Declaration of Douglas Mennie (From prosecution history of U.S. Appl. No. 10/198,872).
Diebold: Merchant MicroBranch, "Merchant MicroBranch Combines ATM After-Hour Depository Rolled-Coin Dispenser," Bank Technology News, 1 page (Nov. 1997).
Fa. GBS-Geldbearbeitungssysteme: GBS9401SB Technical Specification, 24 pages (date unknown).
Frisco Bay: Commercial Kiosk, 4 pages (date unknown).
Glory: AMT Automated Merchant Teller, 4 pages (date unknown).
Glory: CRS-8000 Cash Redemption System, 2 pages (1996).
Hamilton: Hamilton's Express Banking Center, In Less Space Than A Branch Manager's Desk, 4 pages (date unknown).
ISH Electronic: ISH I2005/500 Coin Counter (with translation), 4 pages (date unknown).
ISII Electronic: ISII I2005/501 Self-Service Unit (with translation), 4 pages (date unknown).
Namsys, Inc.: Namsys Express, Making currency management . . . more profitable, 2 pages (date unknown).
NGZ Geldzahlmaschinengesellschaft: NGZ 2100 Automated Coin Depository, 4 pages (date unknown).
Perconta: Contomat Coin Settlement Machine for Customer Self Service, 2 pages (date unknown).
Prema GmbH: Prema 405 (RE) Self Service Coin Deposit Facility, 2 pages (date unknown).
Reis Eurosystems: CRS 6501/Crs 6510 Cash Receipt Systems, 4 pages (date unknown).
Reis Eurosystems: CRS 6520/ CRS 6525 Standard-Class Coin Deposit Systems, 1 page (date unknown).
Reis Eurosystems: CS 3510 Disc-Sorter, 1 page (date unknown).
Royal Bank: Hemeon, Jade, "Royal's Burlington drive-in bank provides customers 24-hour tellers," The Toronto Star, 1 page (Aug. 21, 1991).
Royal Bank: Leitch, Carolyn, "High-Tech Bank Counts Coins," The Globe and Mail, 2 pages (Sep. 19, 1991).
Royal Bank: Oxby, Murray, "Royal Bank Opens 'Super Branch,'" The Gazette Montreal, 2 pages (Sep. 14, 1991).
Royal Bank: SuperBranch, 2 pages (Feb. 1992).
Scan Coin: CDS 600 & CDS 640 Cash Deposit System—Technical Manual, 45 pages (date unknown).
Scan Coin: CDS 600 User's Manual, 14 pages (date unknown).
Scan Coin: CDS Cash Deposit System, 6 pages (date unknown).
Scan Coin: CDS Coin Deposit System—Technical Referens Manual, 47 pages (1989).
Scan Coin: CDS MK 1 Coin Deposit System—Technical Manual, 32 pages (1991).
Scan Coin: International Report, 49 pages (Apr. 1987).
Scan Coin: Money Processing Systems, 8 pages (date unknown).
Scan Coin: SC 102 Value Counter Technical Manual, 28 pages (date unknown).
Scan Coin: World, 2 pages (Feb. 1988).
UK Search Report claims 1/12, 25/31 and 46/59.
UK Search Report claims 13/16.
UK Search Report claims 16A/18.
UK Search Report claims 19/24, 32/38 and 60/64.
UK Search Report claims 39/45 and 65/84.
U.S. Appl. No. 10/084,856 Advisory Action May 9, 2008.
U.S. Appl. No. 10/084,856 Amendment After Final Apr. 30, 2008.
U.S. Appl. No. 10/084,856 Amendment Request Reconsideration, Oct. 30, 2007.
U.S. Appl. No. 10/084,856 Amendment Submitted with CPA RCE, Jun. 4, 2010.
U.S. Appl. No. 10/084,856 Appeal Brief Filed Aug. 19, 2008.
U.S. Appl. No. 10/084,856 Appeal Filed Affidavit, Sep. 10, 2008.
U.S. Appl. No. 10/084,856 BPAI Decision Examiner Affirmed Dec. 28, 2009.
U.S. Appl. No. 10/084,856 Decision on Reconsideration Denied Apr. 29, 2010.
U.S. Appl. No. 10/084,856 Examiners Answer To Appeal Brief Nov. 21, 2008.
U.S. Appl. No. 10/084,856 Final Rejection, Dec. 31, 2007.
U.S. Appl. No. 10/084,856 Final Rejection Jul. 31, 2007.
U.S. Appl. No. 10/084,856 Pre Brief Appeal Conference Decision, Jun. 19, 2008.
U.S. Appl. No. 10/084,856 Pre Brief Conference Request May 15, 2008.
U.S. Appl. No. 10/084,856 Preliminary Amendment Apr. 11, 2002.
U.S. Appl. No. 10/084,856 Preliminary Amendment, Oct. 23, 2003.
U.S. Appl. No. 10/084,856 Preliminary Amendment, Feb. 27, 2002.
U.S. Appl. No. 10/084,856 Reply Brief Filed, Jan. 15, 2009.
U.S. Appl. No. 10/084,856 Reply Brief Noted, Feb. 12, 2009.
U.S. Appl. No. 10/084,856 Request For Continued Examination, Jun. 4, 2010.
U.S. Appl. No. 10/084,856 Request For Hearing BPAI Decision, Mar. 1, 2010.
U.S. Appl. No. 10/084,856 Requirement For Restrictions Apr. 5, 2007.
U.S. Appl. No. 10/084,856 Response to Election Restriction, Apr. 23, 2007.
U.S. Appl. No. 10/198,872 Advisory Action, Jul. 5, 2006.
U.S. Appl. No. 10/198,872 Amendment Requesting Reconsideration, mailed Jun. 13, 2008.
U.S. Appl. No. 10/198,872 Amendment Requesting Reconsideration, mailed Nov. 20, 2007.
U.S. Appl. No. 10/198,872 Amendment Response Jan. 9, 2007.
U.S. Appl. No. 10/198,872 Amendment Response Jun. 29, 2006.
U.S. Appl. No. 10/198,872 Appeal Brief Filed, Mar. 1, 2010.
U.S. Appl. No. 10/198,872 Examiners Interview Aug. 1, 2007.

U.S. Appl. No. 10/198,872 Appeal Brief Filed, Jun. 15, 2009.
U.S. Appl. No. 10/198,872 Final Office Action Jun. 5, 2007.
U.S. Appl. No. 10/198,872 Final Rejection, Nov. 13, 2008.
U.S. Appl. No. 10/198,872 Office Action dated Mar. 31, 2005.
U.S. Appl. No. 10/198,872 Office Action Mailed Dec. 16, 2004.
U.S. Appl. No. 10/198,872 Office Action Mailed Jul. 29, 2004.
U.S. Appl. No. 10/198,872 Office Action Mailed Oct. 20, 2005.
U.S. Appl. No. 10/198,872 Office Action Mailed Sep. 15, 2006.
U.S. Appl. No. 10/198,872 Office Action Mar. 10, 2006.
U.S. Appl. No. 10/198,872 Reply Brief Filed, Dec. 7, 2009.
U.S. Appl. No. 10/198,872 Reply Brief Noted, Jan. 8, 2010.
U.S. Appl. No. 10/198,872 Response to Office Action, Mar. 11, 2005.
U.S. Appl. No. 10/198,872 Response to Office Action, Dec. 22, 2005.
U.S. Appl. No. 10/198,872 Response to Office Action, Aug. 8, 2007.
U.S. Appl. No. 10/198,872 Response to Office Action, Oct. 25, 2004.
U.S. Appl. No. 10/393,867 Notice of Allowance Oct. 19, 2007.
U.S. Appl. No. 10/393,867 Notice of Allowance Sep. 18, 2007.
U.S. Appl. No. 10/393,867 Office Action Mailed Apr. 20, 2007.
U.S. Appl. No. 10/393,867 Office Action Jan. 25, 2007.
U.S. Appl. No. 10/393,867 Response to Office Action Sep. 20, 2006.
U.S. Appl. No. 10/393,867 Office Action Mailed Sep. 20, 2006.
U.S. Appl. No. 10/393,867 Preliminary Amendment Mailed Oct. 16, 2007.
U.S. Appl. No. 10/393,867 Amendment Response After Final Dated Jan. 25, 2007.
U.S. Appl. No. 10/393,867 Final Office Action Mailed Jan. 25, 2007.
U.S. Appl. No. 11/434,092 Amendment After Final Office Action Nov. 23, 2009.
U.S. Appl. No. 11/434,092 Amendment After Notice of Allowance Mar. 8, 2010.
U.S. Appl. No. 11/434,092 Amendment Request Non Final Rejection Jun. 19, 2009.
U.S. Appl. No. 11/434,092 Amendment Request Non Final Rejection Nov. 20, 2008.
U.S. Appl. No. 11/434,092 Final Rejection Action Oct. 6, 2009.
U.S. Appl. No. 11/434,092 Non Final Rejection Mar. 19, 2009.
U.S. Appl. No. 11/434,092 Non Final Rejection Aug. 21, 2008.
U.S. Appl. No. 11/434,092 Notice of Allowance Fees Mar. 22, 2010.
U.S. Appl. No. 11/434,092 Notice of Allowance Fees May 27, 2010.
U.S. Appl. No. 11/434,092 Notice of Allowance Jan. 4, 2010.
U.S. Appl. No. 11/434,092 Request for Continued Examination Feb. 9, 2010.
U.S. Appl. No. 11/434,092 Request for Continued Examination May 14, 2010.
U.S. Appl. No. 11/726,828 Pre/Exam Formalities Notice May 1, 2007.
U.S. Appl. No. 11/726,828 Amendment Reconsideration After Non/Final Sep. 2, 2009.
U.S. Appl. No. 11/726,828 Amendment Reconsideration After Non/Final Mar. 24, 2010.
U.S. Appl. No. 11/726,828 Application Response To Pre Exam Formalities, Jun. 29, 2007.
U.S. Appl. No. 11/726,828 Non Final Rejection Apr. 2, 2009.
U.S. Appl. No. 11/726,828 Final Rejection Jun. 16, 2010.
U.S. Appl. No. 11/726,828 Non Final Rejection Dec. 8, 2009.
U.S. Appl. No. 11/726,828 Response To Election Restriction Filed Feb. 25, 2009.
U.S. Appl. No. 11/726,828 Notice of Appeal Filed Sep. 16, 2010.
U.S. Appl. No. 11/803,281 Advisory Action, Aug. 12, 2009.
U.S. Appl. No. 11/803,281 Affidavit/Dec Exhibit After Notice of Appeal, Nov. 5, 2009.
U.S. Appl. No. 11/803,281 Appeal Brief Filed, Nov. 5, 2009.
U.S. Appl. No. 11/803,281 Applicant Argument Remarks Made in Amendment, Feb. 12, 2009.
U.S. Appl. No. 11/803,281 Applicant Arguments Remarks Made in Amendment Jan. 20, 2009 9pages.
U.S. Appl. No. 11/803,281 Applicant Arguments Remarks Made in Amendment May 14, 2007 1 page.
U.S. Appl. No. 11/803,281 Application Arguments Remarks Made in Amendment , Jul. 24, 2009.
U.S. Appl. No. 11/803,281 Notice of Appeal Aug. 13, 2009.
U.S. Appl. No. 11/803,281 Notice to Applicant Regarding Non Compliant, Feb. 2, 2009.
U.S. Appl. No. 11/803,281 Final Rejection Apr. 23, 2009.
U.S. Appl. No. 11/803,281 Preliminary Amendment, May 14, 2007.
U.S. Appl. No. 11/803,281 Non/Final Rejection, Oct. 17, 2008.
U.S. Appl. No. 11/803,365 Amendment Reconsideration After Non/Final, Jan. 21, 2009.
U.S. Appl. No. 11/803,365 Amendment Reconsideration After Non/Final, Jul. 14, 2009.
U.S. Appl. No. 11/803,365 Applicant Response to Pre/Exam Formalities, Aug. 17, 2007.
U.S. Appl. No. 11/803,365 Appeal Brief Filed Apr. 8, 2010.
U.S. Appl. No. 11/803,365 Appeal Docketing Notice Sep. 3, 2010.
U.S. Appl. No. 11/803,365 Examiners Answer To Appeal Brief Jul. 6, 2010.
U.S. Appl. No. 11/803,365 Final Rejection, Nov. 9, 2009.
U.S. Appl. No. 11/803,365 Non/Final Rejection, Apr. 14, 2009.
U.S. Appl. No. 11/803,365 Non/Final Rejection, Oct. 20, 2008.
U.S. Appl. No. 11/803,365 Notice of Appeal Filed, Feb. 8, 2010.
U.S. Appl. No. 11/803,365 Pre Exam Formalities Notice Jun. 12, 2007.
U.S. Appl. No. 11/803,365 Preliminary Amendment Aug. 17, 2007.
U.S. Appl. No. 11/803,365 Preliminary Amendment Applicant Arguments May 14, 2007.
U.S. Appl. No. 11/803,365 Reply Brief Filed Jul. 23, 2010.
U.S. Appl. No. 11/803,365 Reply Brief Noted Aug. 20, 2010.
U.S. Appl. No. 11/803,366 Advisory Action Aug. 10, 2009.
U.S. Appl. No. 11/803366 Appeal Docketing Notice, Jul. 22, 2010.
U.S. Appl. No. 11/803,366 Reply Brief Filed, Apr. 20, 2010.
U.S. Appl. No. 11/803,366 Reply Brief Noted, Jul. 7, 2010.
U.S. Appl. No. 11/803,366 Affidavit Dec/Exhibit After Notice of Appeal, Oct. 8, 2009.
U.S. Appl. No. 11/803,366 Amendment After Final Jul. 20, 2009.
U.S. Appl. No. 11/803,366 Amendment Request Reconsideration After Non Final Rejection, Jan. 23, 2009.
U.S. Appl. No. 11/803,366 Appeal Brief Field Nov. 16, 2009.
U.S. Appl. No. 11/803,366 Appeal Brief Filed Oct. 8, 2009.
U.S. Appl. No. 11/803,366 Final Rejection Apr. 20, 2009.
U.S. App. No. 11/803,366 Non/Final Rejection Sep. 23,2008.
U.S. Appl. No. 11/803,366 Notice of Appeal Filed Aug. 11, 2009.
U.S. Appl. No. 11/803,366 Preliminary Amendment May 14, 2007.
U.S. Appl. No. 11/803,366 Examiners Answer To Appeal Brief, Mar. 2, 2010.
U.S. Appl. No. 11/803,381 Amendment Reconsideration After Non/Final Rejection, Jan. 23, 2009.
U.S. Appl. No. 11/803,381 Amendment Reconsideration After/Non Final Rejection, Jan. 27, 2010.
U.S. Appl. No. 11/803,381 Amendment Request Reconsideration After Non final Mailed Jul. 21, 2010.
U.S. Appl. No. 11/803,381 Amendment Submitted Entered With Filing of CPA/RCE, Jun. 30, 2009.
U.S. Appl. No. 11/803,381 Final Rejection, Mar. 30, 2009.
U.S. Appl. No. 11/803,381 Non/Final Rejection, Apr. 23, 2010.
U.S. Appl. No. 11/803,381 Non/Final Rejection, Aug. 12, 2009.
U.S. Appl. No. 11/803,381 Non/Final Rejection, Sep. 24, 2008.
U.S. Appl. No. 11/803,381 Request for Continued Examination Amendment Submitted Jun. 30, 2009.
U.S. Appl. No. 11/803,381 Response To Pre Exam Formalities Notice Aug. 17, 2007.

* cited by examiner

| NOTE | DENOMINATION | MAGNETIC VALUE | INK WEAR VALUE | ULTRAVIOLET VALUE | INFRARED VALUE |
|---|---|---|---|---|---|
| 1 | $5 | .83V | 8 | .23V | .009V |
| 2 | $10 | .59V | 9 | .38V | .090V |
| 3 | $10 | .43V | 5 | .75V | .090V |
| 4 | $100 | .95V | 6 | 1.25V | .060V |
| 5 | $5 | .41V | 4 | .56V | .009V |

*FIG. 6*

SYSTEM AND METHOD FOR SAVING STATISTICAL DATA OF CURRENCY BILLS IN A CURRENCY PROCESSING DEVICE

FIELD OF THE INVENTION

The present concepts relate generally to the field of currency processing systems and, more particularly, to systems and methods for saving processing data of currency bills and/or currency processing systems in a currency processing device and for accessing and/or using processing data of currency bills and/or currency processing systems.

BACKGROUND OF THE INVENTION

A variety of techniques and apparatus have been used to satisfy the requirements of automated currency handling systems. At the lower end of sophistication in this area of technology are systems capable of handling only a specific type of currency, such as a specific dollar denomination, while rejecting all other currency types. At the upper end are complex systems which are capable of identifying and discriminating among and automatically counting multiple currency denominations.

The automated currency handling systems typically measure and/or sense various characteristics of bills being processed. For example, various magnetic properties can be measured using a sensor or sensors adapted to detect magnetic threads and/or magnetic ink in the bills. Non-limiting examples of patents disclosing various automated currency handling systems and associated sensing device(s) include U.S. Pat. Nos. 6,929,109, 6,913,260, 6,843,418, 6,860,375, 6,731,785, and 6,721,442, all of which are assigned to Cummins-Allison Corp. of Mt Prospect, Ill., and are incorporated by reference in their entirety herein.

Periodically, however, the settings on the currency processing systems need to be changed, adjusted, or updated. Further, in some instances, processing problems must be diagnosed. Typically, when solving a problem relating to a currency handling system or when designing new features for such systems where knowledge of currency bills in circulation is critical, a technician or engineer is dispatched to the location of the currency handling system for a day or for a few days to manually log in data related to currency bills that are processed or to perform diagnostic tests to determine why the currency handling system is not functioning properly, as appropriate.

The time lag between the detection of a problem event, service call to the manufacturer or vendor, and resolution of the problem on-site, a period which may span several days, adversely impacts the currency handling system utilization. A need exists for minimization of such currency handling system downtime.

SUMMARY OF THE INVENTION

Applicants have determined that one solution to minimize the downtime of automated currency handling systems resides in creating a database for storing raw data and/or statistical data of bills and/or the sensors and/or other automated currency handling system components or systems as the bills are processed during the ordinary operation of the currency handling system. When and if a problem occurs, the technician, other responsible person (e.g., technical support, technician dispatcher, engineer, programmer, etc.), or diagnostic software could access the database to troubleshoot the problem locally or remotely by reviewing raw data related to one or more sensors and/or derivative data inclusive of statistical data associated therewith.

In at least some embodiments, the present concepts include a currency processing system data storage arrangement including a currency processing system comprising a first controller, a communication interface, and at least one sensor arranged to obtain raw data associated with the currency processing system, the at least one sensor being adapted to output a signal bearing the raw data obtained by the sensor to the first controller. The currency processing system data storage arrangement also includes a data storage medium defining a database for storing at least one of the raw data or derivative data associated therewith received from the first controller through the communication interface. The raw data may correspond to at least one of a sensed characteristic of a currency bill processed by the currency processing system and a component of the currency processing system and the derivative data may correspond to statistical data associated with the raw data. The data storage medium is accessible by at least one of the first controller and a second controller through at least one of the communication interface and another communication interface.

In another embodiment, a method for processing data relating to a currency processing machine includes the acts of transporting currency bills along a currency processing system transport path past at least one sensor arranged to sense at least one characteristic of the currency bill, outputting from the at least one sensor a signal corresponding to the at least one characteristic, and processing the signal in the controller to generate derivative data relating to a performance metric for the at least one sensor. The method also includes the acts of outputting the derivative data to a data storage medium and performing at least one of a polling of the data storage medium for the derivative data from a connected computer and outputting from the data storage medium the derivative data to a connected computer.

In another embodiment, a method for storing and utilizing data relating to a currency processing system includes the acts of transporting a plurality of currency bills along a currency processing system transport path past a sensor arranged to sense at least one characteristic of the plurality of currency bills and outputting to a controller raw data corresponding to the at least one characteristic for the plurality of currency bills. The method also includes performing at least one logical operation on the data with the controller to produce statistical data corresponding to the characteristic for at least the plurality of bills, the characteristic being associated with a condition of at least one of a currency bill substrate, ink, and security feature. The statistical data is then output to a data storage medium.

In yet another embodiment, a method for using currency processing system data includes the acts of using a controller to access raw data borne by a data storage medium relating to a condition sensed by at least one sensor, performing at least one logical operation on the raw data using the controller to produce statistical data corresponding to at least one of the condition and the sensor, and comparing the statistical data to a performance metric established for a respective one of the condition and the sensor.

The above summary of the present concepts is not intended to represent each embodiment, or every aspect, of the present concepts. Additional features and benefits of the present concepts will become apparent from the detailed description, figures, and claims set forth below.

BRIEF DESCRIPTION OF THE DRAWINGS

Other features of the invention will become apparent upon reading the following detailed description in conjunction with the drawings in which:

FIG. 6 shows a table depicting a hypothetical example of a use of measured data in accord with at least some aspects of the present concepts.

DETAILED DESCRIPTION OF THE ILLUSTRATED EMBODIMENTS

The present concepts generally relate to data storage of and use of processing information concerning a processed material (e.g., documents, currency bills, substitute currency media) and the processing device (e.g., currency processing system 102 or components or sub-systems thereof). As used herein, the term currency bill and "bill" includes both U.S. currency bills (i.e., U.S. legal tender, such as $1, $2, $5, $10, $20, $50, and $100 bills) and foreign currency bills (i.e., legal tender of other countries, such as the Euro, Yen, or Pound). Substitute currency media include documents which are redeemable for cash, goods, or services.

In accord with the present concepts, technicians, technical support staff, engineers, analysts, programmers, and/or other designated personnel (hereinafter collectively "designated personnel" or "personnel") can remotely access sensor data and/or processing data. The term "designated personnel," as used herein, includes authorized employees and/or agents of the currency processing machine manufacturer or manufacturer of sub-systems, or components thereof. Further, according to some embodiments, such designated personnel can remotely update sensor settings, update variables affecting the performance of the currency processing system 102, or remotely actuate devices which might be necessary to physically reconfigure a sensor or machine component (e.g., to reorient a sensor).

Figure 1:
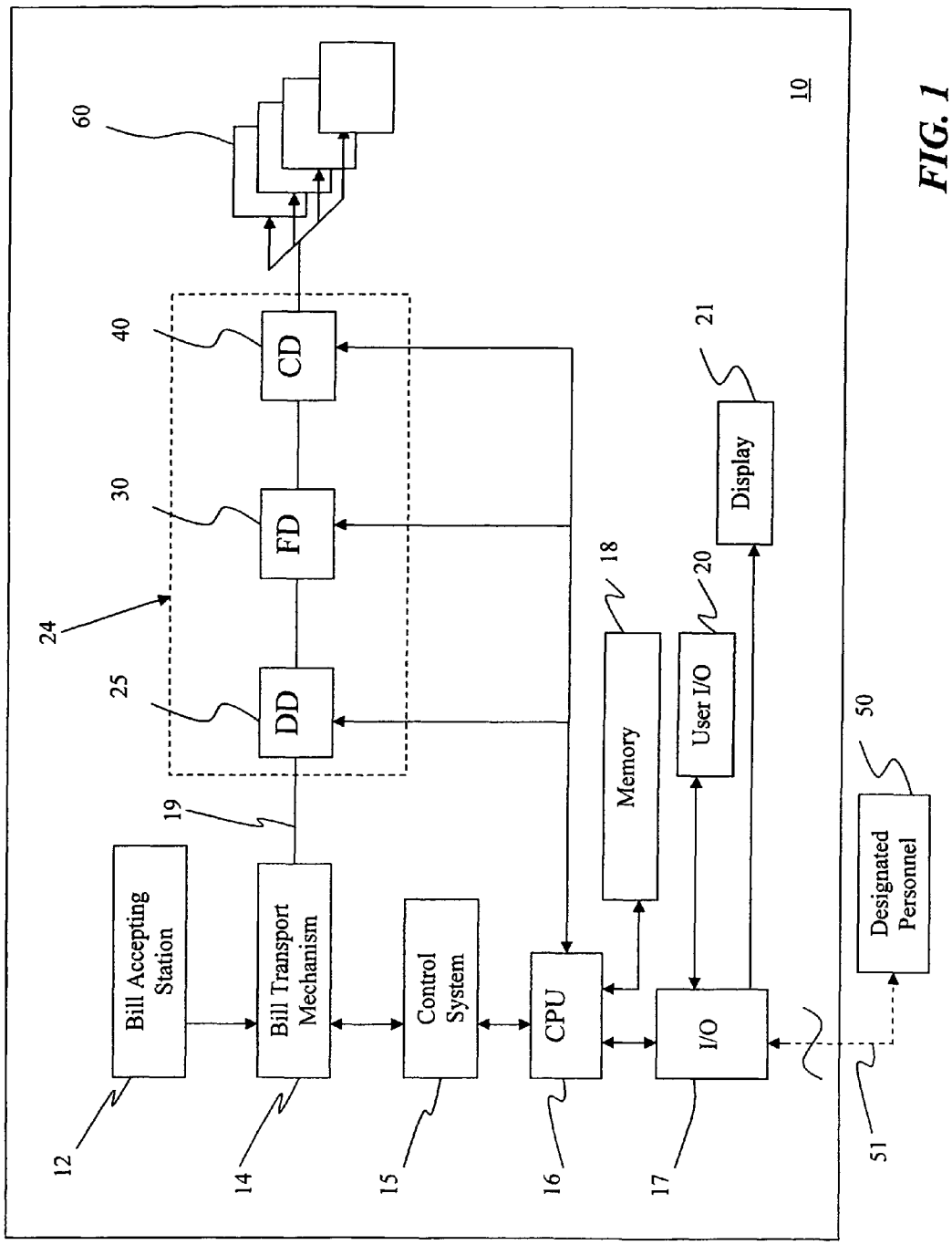
FIG. 1 is a block diagram illustrating a currency processing system according to at least some embodiments of the present concepts.

FIG. 1 shows a functional block diagram generically illustrating one potential currency processing system 10 which may be used in accord with at least some embodiments of the present invention. The currency processing system 10 includes a bill accepting station 12 where stacks of currency bills (or substitute currency media) that need to be identified, authenticated, and/or counted are positioned. The currency processing system 10 picks out and separates currency bills, one bill at a time, from the accepting station 12 and sequentially relays the bills via transport mechanism 14 along a transport path 19. The transport path 19 speed may be set to a rate of at least about 800 bills per minute (bpm), 1000 bpm, 1200 bpm, or 1500 bpm, and/or at least an intermediate speed thereto.

The currency bills are transported by the transport mechanism 14 to a reading device 24 comprising one or more sensors/detectors configured to detect various characteristics of a processed currency bill or other media, as appropriate. As generally depicted in FIG. 1, the reading device is shown to include a denomination detector (DD) 25, a fitness detector (FD) 30, and a counterfeit detector (CD) 40. Subsequent to the processing of the currency bill by the reading device 24, the processed currency bill is passed to one of a plurality of output pockets 60 designated by control system 15.

The currency processing system 10 may comprise a unitary device (i.e., a single device) or may comprise a plurality of devices used in combination. Moreover, although the currency processing system 10 shown in FIG. 1 includes denomination discrimination detector(s) 25, fitness detector(s) 30, and authentication detector(s) 40, at least one of these detectors may be optionally omitted in accord with any intended use of the currency processing system. For example, where the denomination and/or series of the respective bills is already known (e.g., the machine is used to pass only a single denomination) or is not required, the denomination discrimination detector(s) 25 may be omitted. If the fitness and authenticity is not at issue in a particular application, the fitness detector(s) 30 and authentication detector(s) 40 may likewise be omitted.

The operation of the currency processing system is performed under the control of a processor or processors 16 (e.g., CPU) associated with a memory 18. The memory 18 may comprise a conventional currency processing system or currency processing system memory, or may comprise, in accord with the present concepts, a data storage medium and collection database, as described hereinafter. The currency processing system 10 also includes an input/output (I/O) interface 17 to permit connection of the currency processing system, and more particularly the processor 16 to external devices, communication lines, and the like, including but not limited to a display or touch-screen display 21 and a user I/O interface 20, such as a keypad or keyboard. In accord with the present concepts, a communication path 51 is associated with the I/O interface 17 and permits designated personnel 50 to access and transfer data to or from the CPU 16 and/or memory 18. The communication path 51 may comprise any carrier signal pathway including, but not limited to wireless signal paths (e.g., infrared (IR), radio frequency (RF), light-based, or acoustic-based data communications) or hard-wired signal paths, such paths being adapted to convey electrical, electromagnetic or optical signals bearing digital data streams, packets, or bursts.

Figure 2:
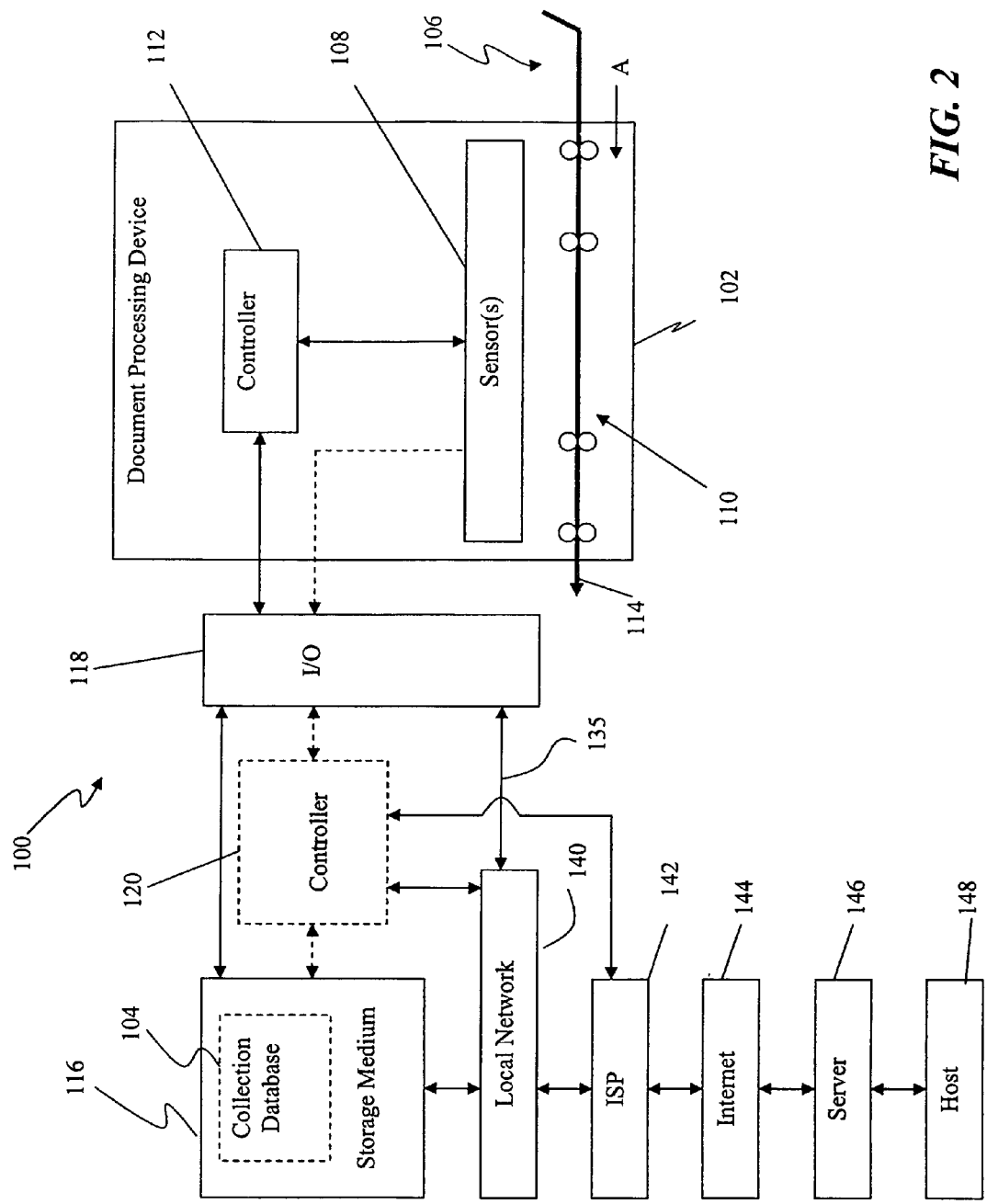
FIG. 2 is a representation of a currency processing system and database arrangement in accord with at least some embodiments of the present concepts.

In the example of FIG. 2, a transport mechanism 110 likewise transports the currency bills, one at a time, through the currency processing device 102 of the currency processing system 100 in the direction of arrow A, past at least one sensor 108, and to one or more output receptacles 114. The sensor 108 is adapted to detect one or more predetermined characteristics of a currency bill. The sensor 108 may include, for example, a currency detector, an imager, and/or various other types of sensors utilized for detection of currency bill, substitute currency media, or document characteristics. In one aspect, the sensor 108 may capture an image of at least a portion of each currency bill and may optionally be operatively associated with an image quality unit to monitor the image quality of the captured image. The sensors 108 may include one or more of the sensors 24 described in connection with FIG. 1. Various other aspects of sensors 108, such as an imager, that may be utilized by the present invention are described in detail in U.S. Pat. Nos. 6,731,786 and 6,363,164, which are hereby incorporated by reference in their entirety.

FIG. 2 is a functional block diagram of a currency processing data collection system 100 according to at least some aspects of the present concepts. The data collection system 100 includes a currency processing device 102 and a data storage medium 116 comprising a collection database 104. Although the data storage medium 116 and associated collection database 104 are depicted as residing outside of the currency processing device 102, these elements may be disposed within the currency processing device (e.g., as part of an internal controller 112, in association therewith), or in association with an external controller 120 or may be disposed remotely. If the data storage medium 116 and associated collection database 104 are remotely disposed relative to the currency processing device 102, the output from the currency processing device may be provided to the data storage device via any communication interface or pathway.

In FIG. 2, a sensor 108 (e.g., an imaging sensor) is shown to provide output signals or data (e.g., image data) to an internal controller 112, which then processes the information and/or passes the information to a communication interface or input/output (I/O) interface 118. The communication interface 118 then passes the information to an external controller 120, a data storage medium 116 or associated collection database 104, or a network link 135. In at least some embodiments, internal controller 112 may be omitted and the sensor data 108 may be output directly through the communication interface 118 to the external controller 118 or network link 135. Processing of the raw sensor data (e.g., image data) may be performed by the internal controller 112, external controller 120, or host 148. As depicted, external controller 120 is an optional controller, as indicated by the dashed lines, and an internal controller 112 is provided within or in association with the currency processing device 102.

As used herein, the term controller may comprise any combination of hardware, software, and/or firmware, inclusive of one or more processors and associated supporting components and systems necessary for operation, that may be disposed or resident inside and/or outside of the currency processing device for communicating with and/or controlling transfer of data between the data storage device and the currency processing device, a bus, communication device, computer, processor, device, service, and/or network.

Communication interface (I/O) 118 may comprise, for example, a serial interface, a parallel interface, a USB interface, a wireless interface adapted for wireless communication with a remote device, or any other suitable I/O interface. For example, the communication interface 118 may comprise an integrated services digital network (ISDN) card or a modem to provide a data communication connection to a corresponding type of telephone line. Communication interface 118 may also or alternatively comprise a local area network (LAN) card and network link 135 to provide a data communication connection to a compatible LAN 140. Wireless links or hardwired links may also be advantageously implemented. Communication interface 118 thus sends and receives electrical, electromagnetic or optical signals that carry digital data streams, packets, or bursts representing various types of information. These signals from communication interface 118 may be selectively output to, or input from, an external controller 120, storage medium 116, LAN 140, ISP 142, the "internet" 144, a server 146, or a host 148, or a plurality thereof. Although not shown in FIG. 2, the designated personnel may access storage medium 116 through any of the communication interface 118, external controller 120, LAN 140, ISP 142, internet 144, server 146, host 148.

For example, network link 135 typically provides data communication through one or more networks to other data devices. For example, network link 135 may provide a connection through a local network 140 to a host computer 148 or to data equipment operated by an Internet Service Provider (ISP) 146. ISP 146 in turn provides data communication services through the worldwide packet data communication network, the "Internet" 128. Local network 140 and the Internet 144 both use electrical, electromagnetic or optical signals that carry digital data streams. The signals through the various networks and the signals on network link 135 and through communication interface 118, which carry the digital data to and from controller 112, are exemplary forms of carrier waves transporting the information. Controller 120 can send messages and receive data, including program code, through the communications interface 118. In one example, controller 120 can send messages and receive data through network(s), network link 135, and communication interface 118. In an Internet example, a server 146 might transmit a requested code for an application program through Internet 144, ISP 142, local network 140 and communication interface 118. Received code may then be executed by a controller 120 processor as it is received, passed to and executed by a controller 112 processor as it is received, and/or stored in a controller (e.g., 112, 120) memory or other storage device for later execution. In this manner, a controller (e.g., 112, 120) may obtain application code in the form of a carrier wave.

In accord with the present concepts, input/output (I/O) or data communication paths are provided between currency processing system 102 components (e.g., guide members) or sub-systems (e.g., sensors, actuators) to a data storage medium 116, communication interface 118, internal controller 112, and/or external controller 120. The data storage medium(s) 116 may be disposed within the currency processing system, locally in the same room as the currency processing system, or remotely (i.e., external to the room housing the currency processing system). The data storage medium(s) 116 may itself comprise a removable data storage device, fixed data storage device, and/or removable data storage media.

The currency processing system 102, such as is described above by way of example, is used to extract various processing data such as, but not limited to, characteristic data of each currency bill or substitute currency media. The extracted (i.e., sensed, measured, or otherwise entered) characteristic data is output in a form appropriate to a selected communication pathway to at least one of a processor or a data storage device for direct or indirect storage. In various aspects, the characteristic data is converted to another form, such as a numerical and/or graphical statistical representation of the data, which enhances comprehension of such data by a user. Such characteristic data might relate, for example, to the serial number of a currency bill, magnetic properties of magnetic ink of a substitute currency media, percentage of skew of a document, location of a currency bill or security paper watermark, or the presence of and/or location or orientation of a anti-counterfeiting thread or ribbon.

The processing data stored in accord with the present concepts may be any type of data characteristic of the performance of the currency processing system 102 or components or sub-systems thereof, or of the materials processed by such currency processing system, components, or sub-systems thereof. In various examples, the processing data may be raw data or may be derivative data. The raw data is that data which relates, for example, to a specific output, reading, characteristic, position, or history. The derivative data is that data obtained by subjecting the raw data to processing, a logical operation or operations, or computations to facilitate interpretation of the raw data such as, but not limited to, transforming raw data into statistical data.

Figure 3:
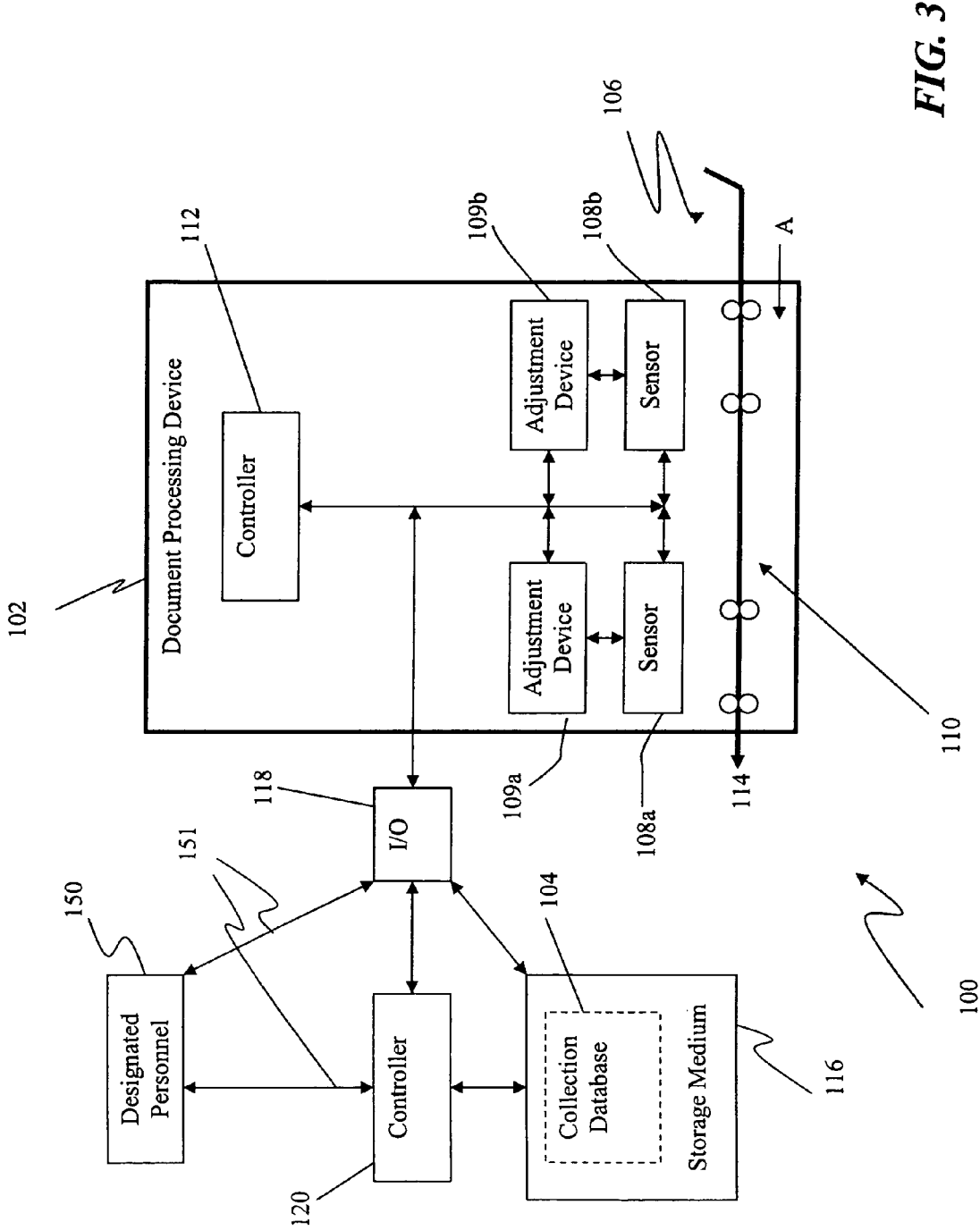
FIG. 3 is a representation of another currency processing system and database arrangement in accord with at least some embodiments of the present concepts.
Figure 4:
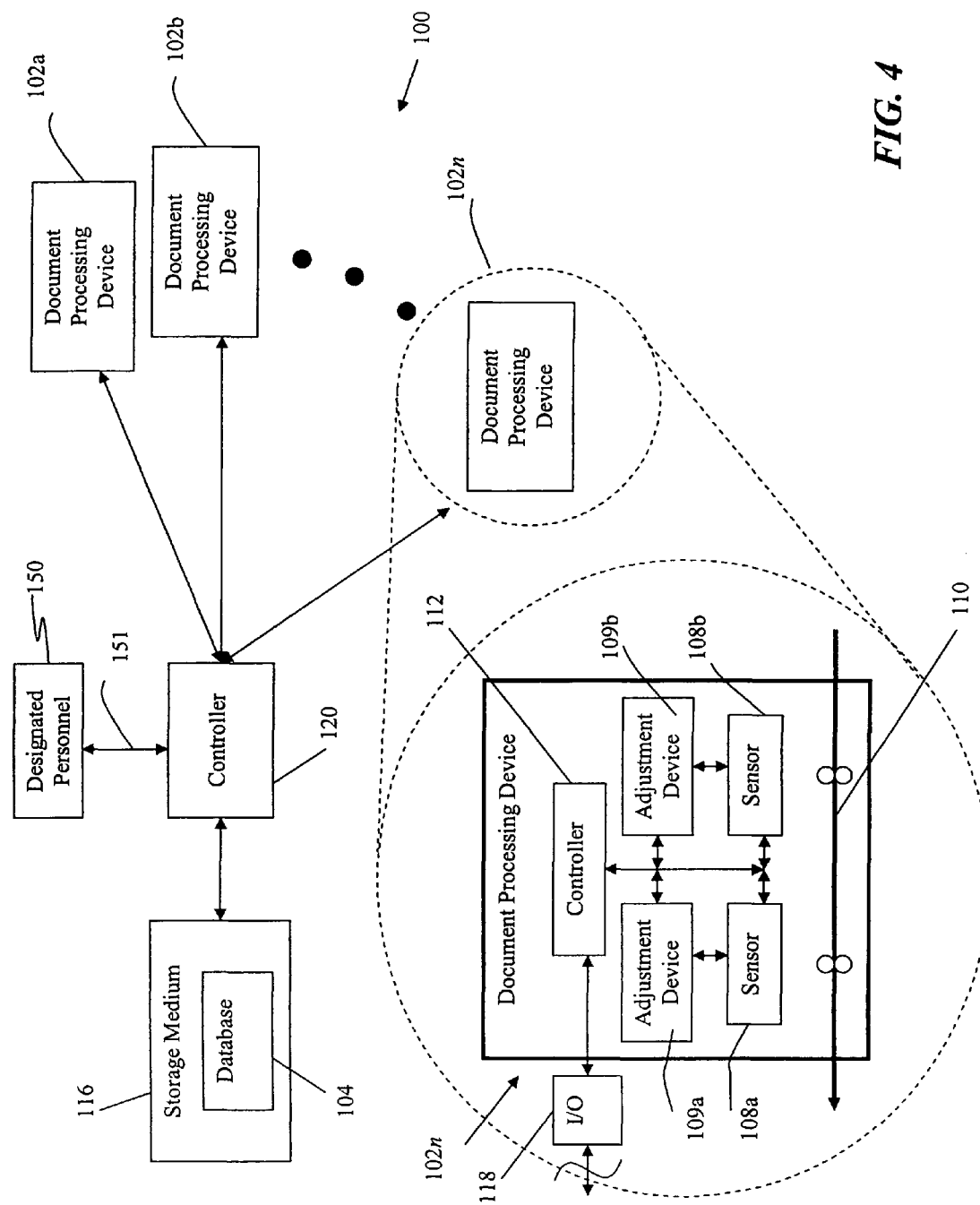
FIG. 4 is a representation of still another currency processing system and database arrangement in accord with at least some embodiments of the present concepts.

FIG. 3 shows another example of a currency processing system 102 wherein the data storage medium 116 is provided externally to and connected to the currency processing system. In the example of FIG. 3, both an external controller 120 and an internal controller 112 are provided. In the embodiments shown by way of example in FIGS. 2-3, the data storage medium 116 is configured to receive processing data from a single currency processing system 102. The data storage medium 116 may optionally be connected to a plurality of other currency processing systems, such as is shown in the example of FIG. 4.

In FIG. 3, the designated personnel 150 is shown to be able to access either the currency processing machine 102 I/O interface 118 or the external controller 120 to thereby obtain access to the data storage medium 116. In one example, external controller 120 may be a computer used by the designated personnel 150.

FIG. 3 also shows that the currency processing machine 102 includes sensors 108(a)-(b) and adjustment devices 109 (a)-(b). Any number of such devices could be provided. The sensors 108(a)-(b) may comprise any sensor noted or described herein, or any sensor adaptable for use in a currency processing machine 102. The adjustment devices 109a, 109b shown in FIG. 3 may include, but are not limited to, microcontrollers, switches, voltage and/or current regulators, or actuators (e.g., linear actuator, rotary actuator, etc.). The adjustment devices 109a, 109b include any device or system configured to permit adjustment of a setting for an associated one of sensors 108a, 108b, either physically or electronically. For example, a micro-actuator may be used to change a position and/or orientation of a sensor relative to the transport mechanism 110. The adjustment devices 109a, 109b may alternatively be used to directly control a currency processing system data variable (e.g., position of guide plate, registration stop, speed or rate of conveyance, etc.). Further, controller(s) 112, 120 may utilize an adjustment device 109a, 109b to selectively engage and/or disengage an associated sensor 108a, b. Thus, according to some embodiments, if one sensor is malfunctioning, designated personnel may remotely reconfigure the currency processing system to take the malfunctioning sensor off-line and/or re-adjust other sensors to temporarily compensate for the loss of the malfunctioning sensor, if necessary, so as to permit the currency processing machine to remain on-line until the time of the actual site-visit by a technician or other designated personnel to repair or replace the malfunctioning sensor.

The adjustment devices 109a, 109b may comprise programmable devices which, in at least some embodiments, lend themselves to electronic updates and/or or instruction set changes including, but not limited to, software changes to set-points, addition of new instruction routines, and/or modification of logic within existing instruction routines. These modifications may reside within or be separate from internal controller 112 and/or external controller 120. Although the adjustment devices 109a, 109b could be updated or changed locally, the adjustment devices 109a, 109b are preferably remotely updatable or changeable, by designated personnel, to remotely alter the way in which raw data from the sensors 108a, 108b is processed. Thus, instead of changing the output of the sensors 108a, 108b, by bringing about a physical change in the sensor or a sensor variable, the back-end processing of the raw data may be altered.

The processing data stored in the data storage medium 116 provides a basis for analysis by designated personnel and even by diagnostic applications. The data may be processed to problem pre-cursor to yield statistical data, which may illustrate, for example, to problem pre-cursor, historical data (i.e., trending or trend analysis over a selected period of time) and/or pre-cursor data (e.g., data corresponding to a window of time immediately proceeding a specified problem, time, or event). Currency processing machines use various numerical thresholds for measurements taken by various sensors to validate scanned notes. For example, one measure of validity might require that a voltage output by a particular sensor be within a certain range. This range may be determined by running known valid notes repeatedly through the currency processing machine to obtain a large data set of sensor data from which statistical correlations may be developed concerning the output of the sensor. For example, 1000 runs of a known valid currency bill may yield a $2\sigma$ grouping of voltages between 0.95 and 0.97 V, with a $3\sigma$ grouping of voltages between 0.94 and 0.98 V. The range would then be selected by the designated personnel in view on this data. However, these thresholds must sometimes be updated such as to reflect modifications to a currency (e.g., upgrading of counterfeiting measures by the U.S. Treasury) or to reflect changes in a user's requirements (e.g., requiring different settings to run different denominations or currencies). These threshold may also be required to be modified to correct for sensor drift and may simply require recalibration. Still further, an environmental condition (e.g., humidity, temperature, magnetic fields) may also mandate that a setting be changed to compensate for any deleterious effects caused by such environmental condition.

To avoid having to send designated personnel to the location of a currency processing device 102 to run a series of diagnostic tests on a particular currency processing system, a currency processing system according to some embodiments of the present concepts outputs processing data to a data storage medium 116. As noted above, the processing data may include both the characteristic data of a processed media as well as currency processing system data. The designated personnel may then access the data storage medium 116, locally or remotely, to attempt to diagnose any problem that may be indicated by the processing data. In one aspect, the processing data may be processed (e.g., derivative data) to obtain measured statistics for the characteristic data of a processed media and/or currency processing system data. The original processing data may also be separately stored in an associated data storage medium 116. The processing data is preferably organized within a collection database 104 accessible by designated personnel using a controller 112, 120. The controller 112, 120 may comprise or may be associated with a diagnostic system permitting the controller to perform analysis of the received data to highlight or flag any potential problems indicated by the data in the collection database 104.

Based on the analysis performed by the designated personnel upon review of data contained within such collection database 104, or upon the analysis thereupon which may be performed by a controller 112, 120 having diagnostic capabilities (e.g., via software or a service), the setting and thresholds for a particular sensor, actuator, and/or currency processing system variable may be developed without having to run entire series of separate tests and with minimal delay. Moreover, the processing data may be continually monitored and trended to determine whether or not a particular sensor or component may be performing erratically, trending toward failure, requiring maintenance, or the like. The processing data may be analyzed periodically or continuously to ensure optimal performance. As to different machines of the same type which might be operatively associated with the same data storage device and/or collection database, processing data or processed processing data may be compared between like currency processing systems, subsystems, or components, to provide additional performance measures and trending data.

In various aspects of the present concepts, designated personnel may access the collection database 104 without having to leave his or her office, or may even access the collection database while in transit or while out of their office. For example, an engineer working for the manufacturer of the currency processing device or for the manufacturer of a subsystem or component thereof or a service technician may request from the data storage medium 116 processing data for particular parameters of interest to the engineer in considering a design modification to such device, system or component, or in determining whether a particular currency processing machine or group of such machines is trending toward a common mode failure or degradation observed in other currency processing machines. Such designated personnel may, for example, remotely interrogate the data storage medium 116, a controller 120 associated with the data storage medium, or a controller 112 associated with the currency processing system 102. The designated person may also request that the currency processing system 102 transmit requested data or predetermined types of data through an appropriate communication path.

Processing data which may be stored in data storage medium 116 may include, for example, correlation sums and denominations (e.g., front side, back side, second best), such as is described in U.S. Pat. Nos. 5,295,196 and 5,751,840, incorporated herein by reference in their entirety. In this aspect, an optical sensing device is provided for discriminating between currency bills of different denominations and a correlation technique utilized to analyze sensed bill reflectance characteristics obtained by illuminating and scanning a bill (e.g., along its narrow dimension). Reflectance signals are obtained by sampling and processing the reflected light at a plurality of predefined sample points and the reflectance data is compared with pre-stored master patterns to generate a correlation number representing the extent of similarity between the master patterns and the sampled pattern(s). The denomination of the scanned currency bill may be assigned based in whole or in part upon the correlation number(s) assigned to the currency bill.

To illustrate this example of the use of processing data, a first correlation number of 900 and a second correlation number of 700 may be generated based on measurements from a selected side of an unknown U.S. currency bill. The primary correlation (e.g., correlation number of 900) may be used to denote the currency bill as a $5 note. However, in accord with the present concepts, instead of discarding the secondary correlation, which might have indicated a correspondence (albeit statistically weaker) of the currency bill to a denomination different (e.g., $10) than the denomination assigned the currency bill based on the primary correlation number, such correlation number data and denomination data may be stored in data storage medium 116 rather than simply being discarded after a determination has been made by the controller (e.g., 112). Thus, in accord with the present concepts, all sensed, measured, and/or processed data may be saved in data storage medium 116 as any such data may ultimately be useful to designated personnel seeking to diagnose a problem and/or to engineers or other designated personnel seeking to improve upon the design of and/or performance of the currency processing system.

Other information and metrics which may be stored in data storage medium 116 may include, for example, all data or portions of data concerning color correlation sums and denominations (see, e.g., U.S. Pat. Nos. 6,731,785 and 6,721, 442, incorporated herein by reference in their entirety), left and right density results, magnetic results, UV and/or fluorescence results, thread results, fine line results, IR results, limpness results, thickness results, x-size results, y-size results, holes results, tears results, folds results, corners results, soil detection results, graffiti detection results, bar-code number results, tape detection results. Further data could include the actual denomination, assigned denomination, evidence of rejection as an invalid currency bill, basis for rejection of an invalid currency bill, and/or leading edge position and/or leading edge orientation relative to a designated registration stop or reference point. In accord with the present concepts, the raw data or actual received patterns from each sensor (e.g., density, magnetism, read heads, color read heads, IR, UV, etc.) may be stored in data storage medium 116 together with results of the derivative data to provide additional tools and data to designated personnel resolving issues with the currency processing system 102.

In other examples, designated personnel receiving notification of a problem with a currency processing machine may request, or may automatically be provided with, processing data comprising the processing conditions at the time of the problem such as, but not limited to, machine identification information, job report (i.e., operator, job, batch information, error code data, operation sequence window for a predetermined time period or predetermined number of processed currency bills prior to the problem, etc.), and any historical data on the particular machine, which may indicate underlying corrective maintenance issues or the need for more significant engineering involvement. In one specific example, engineers may use characteristic data comprising an image of an edge of a currency bill and superimpose over such image an indication of where the edge of the note was determined to be by other sensors. This correspondence may be used to determine a correlation between sensors and to provide sufficient feedback to permit the engineers to rectify suspect detection tables or to otherwise enhance the currency processing machine denominating capability.

Figure 5A:
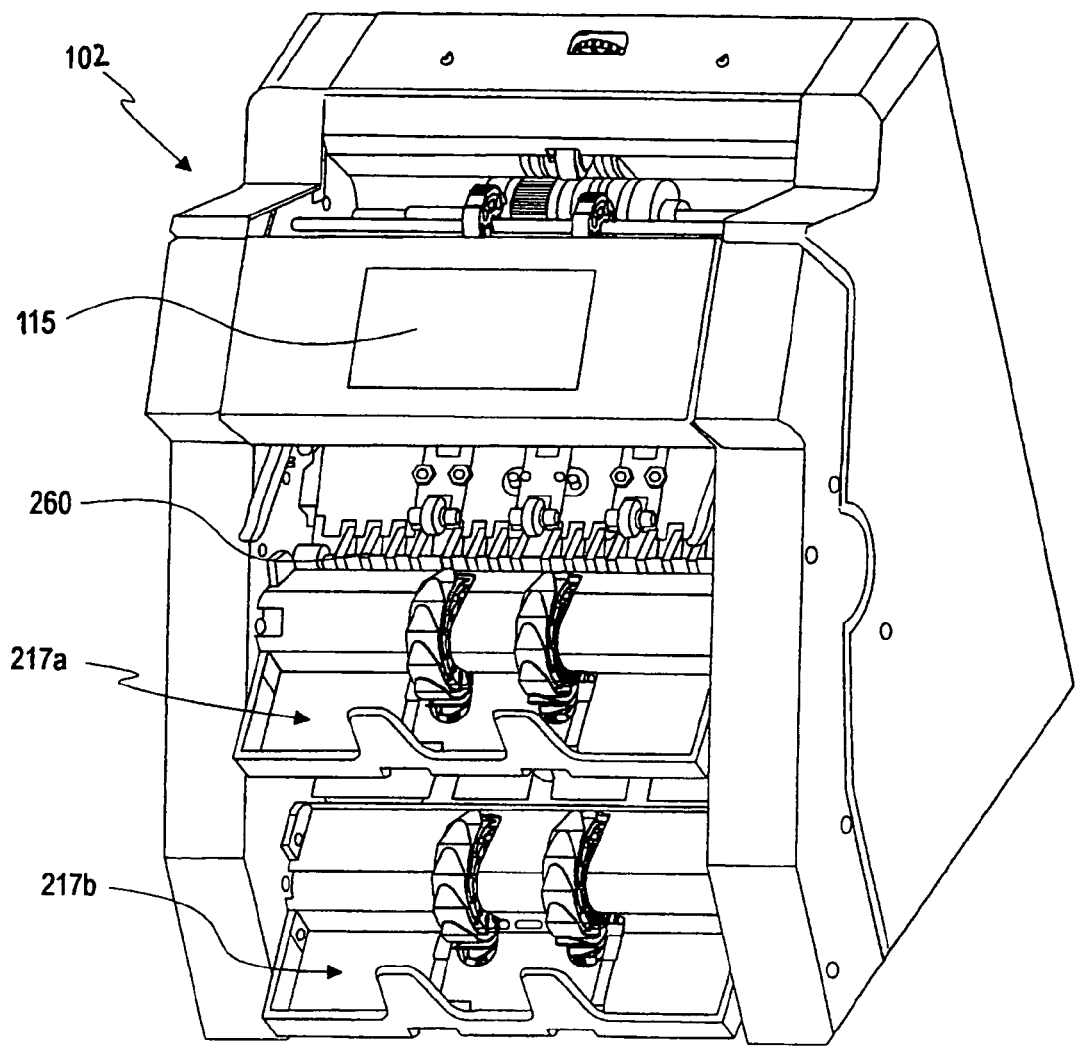
FIGS. 5(a)-(d) show examples of currency processing machines which might be configured in accord with at least some embodiments of the present concepts.
Figure 5B:
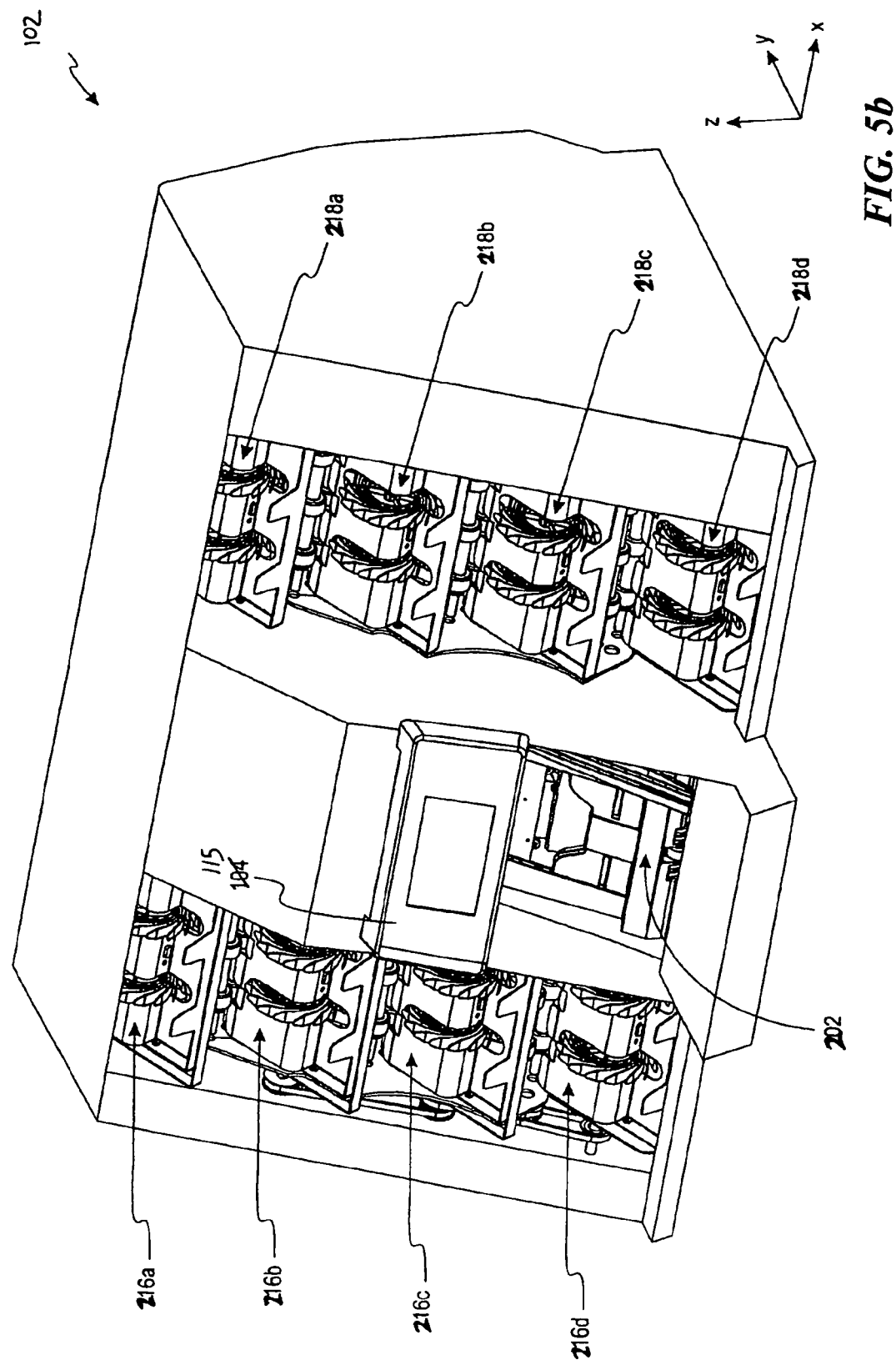
Figure 5C:
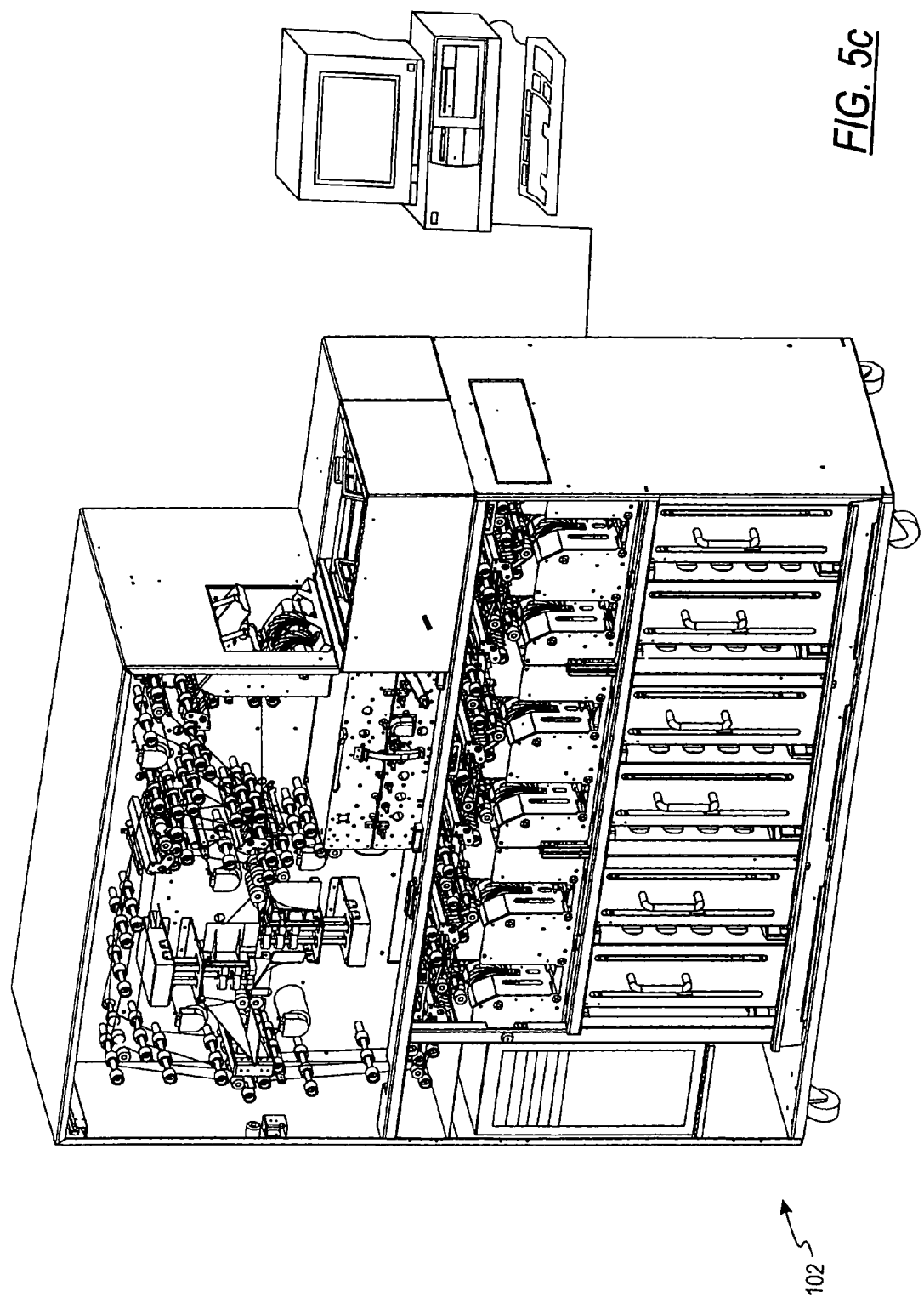
Figure 5D:
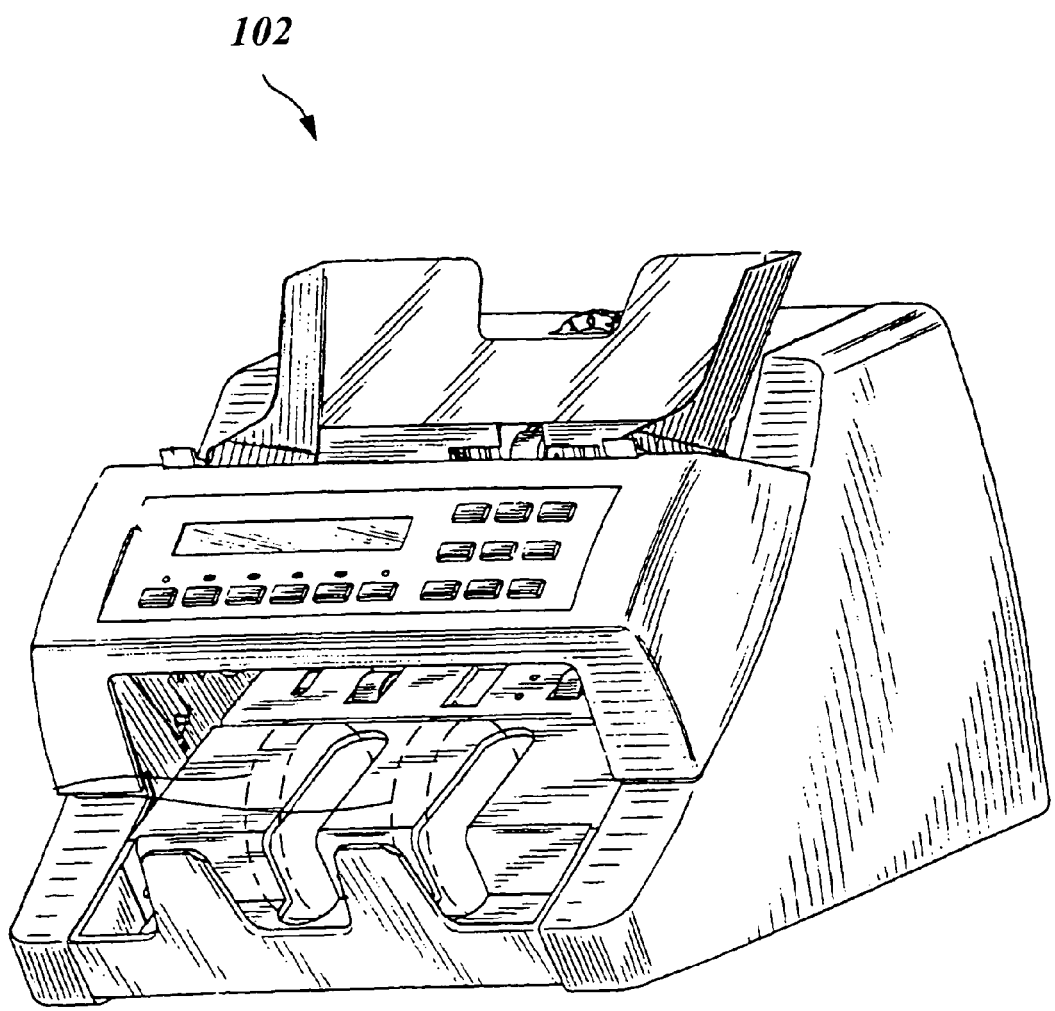

The present concepts may be utilized in combination with any currency processing and/or authenticating devices, tools and techniques employed by the various commercial currency processing systems including, but not limited to, those of Cummins Allison, DeLaRue, Glory, Giesecke & Devrient, or others. In other words, according to at least some embodiments, any make or model of currency processing system or currency processing system (e.g., substitute currency media or other documents, etc.) may utilize the present concepts. U.S. Pat. Nos. 5,295,196, 6,311,819, 6,398,000 and U.S. Patent Application Publication Nos. 2004/0028266 and 2005/0029168, each of which is incorporated herein by reference in its entirety, describe examples of currency processing devices 102 which may are suitable for implementation in accord with the present concepts. By way of example, FIG. 5(a) shows a currency processing machine 102 having a user interface 115, a plurality of output receptacles 217a, 217b, and a diverter 260 for directing the bills to a selected output receptacle and FIG. 5(b) shows a currency processing machine 102 having a user interface 115, a plurality of output receptacles 216a-d, 218a-d, and a input hopper 202. FIG. 5(c) shows an example of a multi-pocket sorter currency processing machine having six pockets (not numbered). FIG. 5(d) shows an example of a single-pocket currency processing machine 102.

The present concepts may also be utilized with any type of sensor/detector 108 used in any of the aforementioned commercial currency processing systems or currency processing systems. Examples of some suitable sensor or sensor types are noted below and include, but are not limited to, sensors adapted to sense characters readable by optical character recognition (OCR), including information printed according to the OCR-A and OCR-B fonts, a magnetic pattern, an optical variable device (OVD) pattern such as a hologram, a magnetic or electrically conductive thread, conductive ink, magnetic ink, an electrically conductive polymer, perforations, a coded watermark, or other encoded anti-counterfeiting information. Regardless of the sensor type employed, external data may be appended to the sensor output to aid in indexing, retrieval, and/or searching of data from the data storage medium 116 or collection database 104. Such appended data may include, for example, machine-specific or user-specific information (e.g., transaction data, sequence number, batch number, location data, time stamp data, employee ID data) or currency bill characteristic data, such as might be obtained from other sensors (e.g., serial number, denomination, MICR characteristics).

In at least some aspects of the present concepts, a controller 112, 120 advantageously processes the raw data generated by the sensors to yield derivative data. The derivative data may comprise statistical data regarding the processed currency bills including, but not limited to, total number of processed bills, total amount of processed bills, breakdowns of total amounts of processed bills by denomination, number of no call currency bills, number of counterfeit currency bills, types of counterfeit detected, number of unfit currency bills, types of fitness defects, etc. The derivative data may also comprise statistical data relating to performance metrics for variables influencing the performance of the currency processing system (e.g., control variables). Thus, whereas users of the currency processing machine are concerned with the question of ascertaining the ability of the currency processing system 102 sensor to appropriately characterize a characteristic of a specific currency bill, designated personnel such as engineers and technicians are generally concerned instead with the performance of individual sensors or components of the currency processing machine.

Accordingly, a controller 112, 120 may use all data or selected data from a particular sensor or sensors to develop statistics for a specified performance metric for the particular sensor or monitored element. Selected data, for example, might include only that data which corresponds to authentic currency bills meeting certain minimum levels of fitness, so as to ensure the reliability of the data used to develop the performance metric. For example, a fitness detector may be provided upstream of a denomination detector and a counterfeit detector. Rather than using all data for all processed currency bills to develop the statistics for the performance metrics established for the denomination detector and a counterfeit detector, only data associated with currency bills determined by the fitness detector to be fit or alternatively to meet a very high level of fitness (e.g., "Mint") would be used to develop the statistics concerning such performance metrics. In at least some aspects, the performance metric itself might comprise statistics regarding the ranges of output voltages of the sensor, the maximum, minimum, median, and average values of the output voltage, statistical distributions of the output voltage (e.g., $1\sigma$, $2\sigma$, and $3\sigma$ values), the remaining or expected operational life of the sensors (e.g., hours of operational use since installation versus expected life). In other examples, performance metrics could be developed to monitor and report on the condition of specific components within the currency processing system including, but not limited to, guide plates, roller position, drive element position, motor temperatures, motor voltage, motor starting current, hours of use associated with monitored components, etcetera. As one example, monitoring of steady state or running motor current might indicate a gradual upward trend in current for a given operating condition, perhaps indicating that a source of increased dynamic friction (e.g., degraded bearing) is present in the system. Trending of motor starting currents might similarly provide an early indication of increased loads (e.g., static friction) on the motor.

Additionally or alternatively, instead of using data from a specifically affected sensor to develop a performance metric, other performance metrics may be developed from all data or selected data from other sensors as an indirect check on a sensor of interest. For example, an increased error detection rate by a downstream sensor may be indicative of degraded performance of an upstream sensor. In the example of FIG. 1, a counterfeit detector may comprise a magnetic ink sensor and may be observed to have a slight upward trend in "no call" hits for currency bills having a minimum predetermined fitness level and such trend may be suggestive of an increasing degradation in the performance of an upstream fitness detector.

Further, performance metrics from one sensor may be used in the analysis of and/or acceptance of or rejection of a suspect note as being or degraded performance metric obtained from another sensor. For example, a magnetic ink sensor may find a lower signal level in notes that were also measured to have a low fitness measurement. The system can then learn (or be programmed to recognize) that notes with low fitness values (e.g., ink wear) are allowed to have low ink sensitive counterfeit measurements, thus reducing the machine reject rate and enhancing the system efficiency. FIG. 6 shows a table depicting a hypothetical example of a use of measured data in accord with at least some aspects of the present concepts. In FIG. 6, notes 1 and 5 are $5 notes having hypothetical sensed magnetic values of 0.83V and 0.41V, respectively, with a sensed ink wear value of 8 (reflecting comparatively less ink wear on a scale of 1 to 10) and 4 (reflecting comparatively more ink wear on a scale of 1 to 10), respectively. These ink wear numbers are relative numbers and reflect an overall score for ink wear based on, for example, an imaging of and evaluation of selected optical characteristics of a note, a portion of a note, one side of a note, or an entirety of a note. In this hypothetical example, rather than rejecting the fifth note, the system would be pre-configured (e.g., programmed) or dynamically configured (e.g., self-learning) to correlate the known and/or measured or trended changes in one characteristic (e.g., magnetic value) with a particular value or range of values of another sensed characteristic (e.g., ink wear value).

For example, in the above hypothetical, a currency processing machine may have been initially set with a threshold magnetic value cutoff (i.e., between a valid note and a suspect note, such as a counterfeit or unfit note) for a $5 note at a sensor reading indicating a magnetic value of 0.8V or above. Following the processing of a large number of $5 notes and integration of feedback data (e.g., a subsequent determination as to the fitness of or acceptability of the suspect notes having a sensor reading below 0.8V), the currency processing system determines, or is programmed to accept, a correlation between the ink wear value and the sensed magnetic values in which sensor readings indicating a magnetic value of 0.8V or below may be acceptable in some circumstances, such as is noted above. Thus, a currency processing system 102, starting with a single acceptance criteria for a variable (e.g., the magnetic value), may later determine that a tiered model comprising a plurality of separate acceptance criteria for the variable may be advantageously employed which takes into consideration the influence of one or more other measured variable(s). For example, in lieu of an initial threshold setting of 0.80V as an acceptance criteria for acceptable $5 notes, the currency processing system 102 may eventually determine in the above hypothetical example, following processing of a statistically significant population size of $5 notes, a first threshold magnetic value for $5 notes could be 0.80V or above for $5 notes having an ink wear value of 7 or above, a second threshold magnetic value for $5 notes could be between 0.50-0.80V for $5 notes having ink wear values between 5-7, and a third threshold magnetic value for $5 notes could be between 0.40-0.50V for $5 notes having ink wear values of 4 (e.g., with ink wear values below 4 and/or measured magnetic values below 0.40V being deemed unfit).

Continuing with the above example, the $5 notes also include values of 0.23V and 0.009V for the UV value and IR value, respectively (note 1) and 0.56V and 0.009V for the UV value and IR value, respectively (note 5). In this example, the data would indicate that the IR value is substantially insensitive to the measured magnetic value and the ink wear value. The data also indicates a potential correlation between the UV value and either the measured magnetic value and/or the ink wear value due to the marked difference between the measured UV value and the measured magnetic values and ink wear values for notes 1 and 5. For example, for each of the $5 notes and $10 notes, the UV value appears to be higher for the lower ink wear values. Therefore, if a single acceptance criteria (e.g., 0.007V) was initially provided for a variable associated with a $5 note (e.g., the IR value), the currency processing system may determine that a tiered model comprising a plurality of separate acceptance criteria is not appropriate for that variable where the variable appears insensitive to other variables. For example, in the hypothetical example above, notes 1 and 5 possess the same IR value, as do notes 2 and 3, despite notable differences in the other values, thus indicating that the data would not indicate that an alteration of the acceptance criteria (e.g., 0.007V) in view of other variables would provide an added benefit.

Similarly, as to the ten dollar denominations, note 2 in FIG. 6 has a magnetic value of 0.59V with an ink wear value of 9, a UV value of 0.38V, and an IR value of 0.090V. Note 3 has a magnetic value of 0.43V, an ink wear value of 5, a UV value of 0.38V, and an IR value of 0.090V. Again, with these notes, this hypothetical example illustrates that the IR value for the $10 notes does not appear to be sensitive (taking only the sample size of two notes) to the differences in magnetic value, ink wear, or UV value between notes 3 and 4. The UV value of note 3, however, appears to be almost double that of note 2. Perhaps this could indicate, given this hypothetical, some relation between the different magnetic values and/or ink wear values. Obviously, when a statistically significant population size of a given note denomination is processed, it can be expected that interrelations between variables, with varying degrees of certainty, will become more evident if they exist. Consistent with the present concepts, the currency processing device 102 advantageously captures information on the processed currency and is configured to, by self-learning, to recognize interrelations between variables to assist in the determination of acceptable notes versus unacceptable notes, however acceptable or unacceptable are determined by the operator of the currency processing device. The utilization of such interrelations between characteristics permits the currency processing device 102 to reliably process notes without unnecessarily stopping or off-sorting or otherwise improperly flagging too many notes as suspect and/or unfit.

Thus, in accord with the above, the statistical data for one or more criteria can be used to develop varying threshold value used as a threshold value which is a function of one or more variables.

One or more sensors 108 may be provided. In part, the number of sensors 108 is variable and depends upon the intended function of the currency processing device 102 (e.g., whether the currency processing device is to authenticate, count, and/or denominate currency bills) and the particular characteristics of the currency bills to be examined (e.g., thickness, color, magnetism, reflectivity, absorbability, transmissivity, electrical conductivity, serial number, etc.). The intended function is typically constant, but may optionally be varied. The sensor or sensors 108 may also employ a variety of sensing means including, but not limited to, any combination of the following: a size detector, a density sensor, an upper optical scan head, a lower optical scan head, a single or plurality of magnetic sensors, a thread sensor, an infrared sensor, a UV or fluorescent light scan head, or an image scanner. Examples of these detection means are disclosed in commonly assigned U.S. Pat. No. 6,278,795, entitled "Multi-Pocket Currency Discriminator," which is herein incorporated by reference in its entirety, and co-pending U.S. patent application Ser. No. 09/965,428, entitled "A Document Processing System Using Full Image Scanning," filed on Sep. 27, 2001, which is herein incorporated by reference in its entirety. Examples of discriminating denomination information from a currency bill are shown and disclosed in commonly assigned U.S. Pat. No. 5,815,592, which is herein incorporated by reference in its entirety.

In at least some embodiments, sensor 108 may comprise an imaging sensor, imaging camera (e.g., CCD device, camera, etc.), and/or scanner, to capture an electronic image of one or both sides, or only a portion thereof (e.g., a leading edge portion, a middle portion, an indicia region, a serial number, a portrait, a watermark, a security feature, a trailing edge portion, a top edge portion, a bottom edge portion, or any combination thereof), of a passing currency bill or substitute currency medium. In at least some embodiments, the leading edge may comprise one of the wide or long edges of the currency bill, such as the top edge of the currency bill when the bill is viewed in a normal position (i.e., portrait, text, numbers are right-side up). In other embodiments, the leading edge could comprise one of the narrow or short edges of the currency bill. Imaging of the leading edge portion, trailing edge portion, or edges lateral thereto may be particularly advantageous in troubleshooting currency bill transport problems, as images of this nature may be used determined to determine misalignment or skew of the currency bill during transport. The sensor may be particularly configured, for example, to image such portions of the currency bill relative to one or more reference marks, registration marks or stops, or other known positional indicators.

In at least some other embodiments, one or more detectors may be configured to detect an intensity of reflected light and/or a color from a scanned currency bill or substitute currency medium, such as is described by way of example in U.S. Pat. No. 4,992,825, incorporated herein by reference in its entirety. In another aspect, a scanhead or scanheads may comprise one or more magnetic sensors configured to sense and/or measure a magnetic flux or changes in magnetic flux (U.S. Pat. No. 3,280,974), patterns (U.S. Pat. No. 3,870,629), security threads (U.S. Pat. No. 5,151,257), magnetizable material (U.S. Pat. No. 4,617,458), magnetic field strengths (U.S. Pat. No. 4,593,184), or magnetic patterns or counts from selected portions of the processed currency bill (U.S. Pat. No. 4,314,473). With regard to optical sensing, a scanhead or scanheads may be configured to sense and/or measure a currency bill's density (U.S. Pat. No. 4,381,447), color (U.S. Pat. Nos. 4,490,846; 3,496,370; 3,480,785), length and thickness (U.S. Pat. No. 4,255,651), holes (U.S. Pat. No. 4,381,447), patterns of reflectance and transmission (U.S. Pat. Nos. 3,496,370; 3,679,314; 3,870,629; 4,179,685). Color detection techniques may employ color filters, colored lamps, and/or beamsplitters (U.S. Pat. Nos. 4,841,358; 4,658,289;

4,716,414; 4,825,246, 4,992,825; EP 325,364). An optical sensing system may use ultraviolet light (U.S. Pat. No. 5,640, 463), infrared light, or other light. Each of the aforementioned patents is hereby incorporated herein by reference in its entirety.

In addition to magnetic and optical sensing, other techniques of detecting characteristic information of currency include electrical conductivity sensing, capacitive sensing (U.S. Pat. No. 5,122,713 [watermark, security thread]; U.S. Pat. No. 3,764,899 [thickness]; U.S. Pat. No. 3,815,021 [dielectric properties]; U.S. Pat. No. 5,151,257 [security thread]), and mechanical sensing (U.S. Pat. No. 4,381,447 [limpness]; U.S. Pat. No. 4,255,651 [thickness]). Each of the aforementioned patents is hereby incorporated herein by reference in its entirety.

Fit currency is generally defined by the Federal Reserve as a currency bill that is suitable for continued circulation and is sufficiently clean to allow its genuineness and denomination to be readily ascertained. Likewise, unfit currency is generally defined by the Federal Reserve to be a currency bill that is not suitable for further circulation because of its physical condition, such as being torn, dirty, limp, worn or defaced. A currency processing system 102 may optionally comprise a fitness detector adapted to detect any number of predetermined conditions of the bill including, but not limited to, thickness, limpness, dirtiness, holes, tears, tape, staples, graffiti, ink wear, torn corners, folded corners, paper clips and/or other criteria for making a determination concerning the bill. Thickness detection, limpness detection, and soil detection may be accomplished in accord with, for example, the disclosure of U.S. Pat. No. 4,365,508 and co-pending U.S. application Ser. No. 10/379,365, filed Mar. 4, 2003, to Ken Maier et al., each of which is incorporated herein by reference in its entirety.

It will be understood that the fitness detector 30, if provided, may include one or more detectors arranged to determine a particular fitness criteria and may include sufficient detectors to detect each and every fitness criteria currently recognized or hereinafter devised or imposed. It is also to be understood that the aforementioned sensors may be used as individual sensors or may be combined in various combinations to identify or characterize a designated fitness, defect, denomination, and/or authentication characteristic.

In addition to typical fitness features, some of which are noted above, a currency processing system 102 in accord with the present concepts may include a counterfeit detector 40 to detect the presence or absence of one or more counterfeit protective features incorporated into a bill. Examples of conventional counterfeiting features which may be advantageously sensed by the counterfeit detector 40 include, but are not limited to, magnetic features, such as ferrous oxide inks or coded or magnetic threads, infrared (IR) features (e.g., multifrequency detection, optical pattern detection, and IR transparency), ultraviolet (UV) detection (e.g., reflected UV, through-UV, and fluorescence), and visible features (e.g., polyester fiber strip having data embedded thereon, silk embedded fibers, extremely fine-type printing). UV detection in a counterfeit detector is disclosed, for example, in U.S. Pat. No. 6,748,101 to Jones, et al., which is incorporated by reference in its entirety herein. IR detection in a counterfeit detector is disclosed, for example, in U.S. Pat. No. 6,731,785 to Mennie, et al., which is incorporated by reference in its entirety herein. Magnetic feature detection is disclosed, for example, in U.S. Pat. No. 6,810,137 to Jones, et al., which is incorporated by reference in its entirety herein. Additional examples of conventional counterfeiting features which may be advantageously sensed by the counterfeit detector 40 include thread or foil detection, fluorescence detection, hologram/kintogram detection, window detection, and Mylar detection. Still additional examples include color shifting ink detection, raised ink detection corresponding to intaglio printing, and raised bill detection (e.g., genuine $20 corners attached to a genuine $1 bill).

Still further, the counterfeit detector 40 could be configured to permit watermark detection, such as graphic watermarks, bar code watermarks, and watermarks most likely to be detected using thru-light imaging, or to permit EURion Anti-Copy Detection or similar technology utilizing a plurality of marks (e.g., circles) arranged within bank bills in a predetermined arrangement or constellation. The counterfeit detector 40 could further include scent detection to identify characteristic signatures of chemicals emitted by various kinds of ink or identifier substances that are used in genuine currency and can be an effective way of identifying counterfeits. The counterfeit detector 40 could further include microwave feature detection, X-Ray feature detection, electro-luminescence detection, intaglio print detection, microperforation detection, embedded fiber detection. In view of the above, one or more counterfeit detectors 40 could be provided in combination with one or more fitness detectors 30.

In at least some embodiments, the controller 112 is adapted to control the operation of the device 102 and to communicate information to internal devices, such as the sensors 108 and communications interface 118, and to external devices, such as storage medium 116, collection database 104, and controller 120. Controller(s) 112, 120 may include both a processor and a memory. Controller 112, 120 memory may include, for example, master authenticating information, which includes information about authenticating characteristics of a currency bill (e.g., size, dimensions, thickness, color, magnetism, reflectivity, absorbability, transmissivity, electrical conductivity, serial number, etc.), or master denomination information. The master denomination information includes information about denomination characteristics of a currency bill. Examples of such characteristics are disclosed in commonly assigned U.S. Pat. No. 5,815,592, incorporated herein by reference in its entirety.

In various aspects of the present concepts, the currency bill information and/or media information may be periodically updated in the currency processing device 102 controller 112, or externally in the storage medium or controller 120 memory if desired, by designated personnel. The controller 112 memory may be updated through the communications interface (e.g., I/O) 118. The controller 120 memory may comprise, for example, random access memory, flash memory, EEPROM, or any other suitable rewriteable memory.

FIG. 4 shows that the data storage medium 116 may be advantageously configured to receive processing data from a plurality of currency processing systems 102a-n disposed in one or more locations. The designated personnel 150 is shown to be able to access, in this example, the external controller 120 and the currency processing machine 102 I/O interface 118 and data storage medium 116 therefrom. In one example, external controller 120 may be a computer used by the designated personnel 150. FIG. 4 shows a currency processing system 102n similar to that depicted in FIG. 3. As noted above, any currency processing machine may be utilized in accord with the present concepts. The plurality of currency processing systems 102a-n may comprise a plurality of standalone currency processing systems, a plurality of networked currency processing systems, or a combination of stand-alone and networked currency processing systems.

Thus, in accord with FIGS. 2-4, it can be seen that the data storage medium 116 may be connected to or associated with a single currency processing system 102, such as that shown in FIG. 2 or FIG. 3, or to a plurality of different currency processing systems 102a-n, which may be of the same type or of different types. As noted above, the data storage medium 116 may be remotely located or may reside within of the plurality of currency processing systems 102a-n and may serve other currency processing systems. Thus, in accord with at least some embodiments of the present concepts, a data storage medium 116 is networked or otherwise associated with at least one currency processing system 102, such as through a controller (e.g., 112, 120).

In another aspect, a method for storing and utilizing data relating to a currency processing system 102 comprises the acts of transporting a plurality of currency bills along a currency processing system transport path past a sensor (e.g., sensor 25, 30, 40) arranged to sense at least one characteristic of the plurality of currency bills, outputting to a controller raw data corresponding to the at least one characteristic for the plurality of currency bills, performing at least one logical operation on the data with the controller to produce statistical data corresponding to the characteristic for at least the plurality of bills, the characteristic being associated with a condition of at least one of a currency bill substrate, ink, and/or security feature, and outputting the statistical data to a data storage medium 116. The controller may be a local controller or a remotely disposed controller. The characteristic is, in some aspects, associated with a condition of a currency bill substrate. For example, the characteristic may be associated with a condition of a currency bill substrate including any one or more of a substrate limpness, thickness, length, width, hole, tear, fold, soil, graffiti, and/or tape. The characteristic may also or alternatively be associated, in at least some aspects, with a condition of a currency bill ink, such characteristic including one or more of a density, infrared response, ultraviolet response, fluorescence response, and/or magnetic response. Still further, the characteristic may also or alternatively be associated, in at least some aspects, with a condition of a currency bill security feature including any one or more of an infrared response, ultraviolet response, fluorescence response, transmissivity, reflectance, and magnetic response. Any combination of the above characteristics, whether currency bill substrate, ink, and/or security feature, are utilizable in the above-described currency processing system 102.

In still another aspect, a method for using currency processing system 102 data comprises the acts of using a controller to access raw data borne by a data storage medium relating to a condition sensed by at least one sensor (e.g., sensor 25, 30, 40), performing at least one logical operation on the raw data using the controller to produce statistical data corresponding to the condition and/or the sensor, and comparing the statistical data to a performance metric established for a respective one of the condition and the sensor. This method may optionally include the act of initiating corrective action if the result of the comparison between the statistical data and the performance metric falls below a predetermined performance threshold for the associated one of the condition and the sensor (e.g., sensor 25, 30, 40). This method may optionally include the act of performing the above-noted using, performing, and comparing acts substantially periodically and initiating corrective action if the result of the comparison between the statistical data and the performance metric falls below a predetermined performance threshold for the associated one of the condition and the sensor (e.g., sensor 25, 30, 40).

A currency processing system 102 data storage arrangement, comprising a currency processing system comprising a first controller, a communication interface, and at least one sensor (e.g., sensor 25, 30, 40) arranged to output to the first controller raw data associated with a sensed characteristic of a component of the currency processing system. The currency processing system 102 data storage arrangement also includes a data storage medium 116 defining a database for storing the raw data and/or derivative data associated therewith received from the first controller through the communication interface. The derivative data corresponds to statistical data associated with the raw data and the data storage medium is accessible by the first controller and/or another controller (e.g., a second controller) through the communication interface. In the above currency processing system 102 data storage arrangement according, the first controller and/or a second controller is permitted, responsive to an authorization, to update a currency processing system variable affecting, for subsequent output signals, an output signal by the sensor (e.g., sensor 25, 30, 40) and/or an output signal from the first controller, the output signal from the first controller comprising a signal bearing the raw data and/or a signal bearing derivative data therefrom. The currency processing system 102 may optionally comprise a plurality of sensors (e.g., any combination of sensors 25, 30, 40), each of the sensors being arranged to sense at least one characteristic of a processed currency bill and output a signal bearing data corresponding to the at least one characteristic to the controller. The data storage medium 116 itself may define a plurality of databases, each of the databases being adapted to store data corresponding to each of the plurality of sensors (e.g., any combination of sensors 25, 30, 40). The currency processing system 102 variable comprises, in at least some aspects, a sensor setting and/or a controller-executable instruction set.

In still additional aspects, networked currency processing systems 102a-n, however connected, may share captured information and determined interrelations between variables to assist the other ones of the networked currency processing systems to more reliably process acceptable notes and reject unacceptable notes. Ideally, where all of the settings and sensors are uniform, and the sensors are all properly calibrated, the other ones of the networked currency processing systems may utilize the determined interrelations of other currency processing systems directly. However, where the sameness of the currency processing systems 102a-n is less than ideal, for whatever reason, the determined interrelations of one currency processing system may still be utilized by any of the other currency processing systems as a comparison against the captured information and determined interrelations of the other currency processing systems (e.g., as a check or as a predictor). Thus, at least some of the above-described concepts may be applied not only to a single currency processing system 102, but may be applied to a plurality of other currency processing systems 102a-n to permit all of the currency processing devices to more reliably process notes.

It is thus believed that the operation and construction of the present invention will be apparent from the foregoing description. While the method and apparatus shown or described have been characterized as being preferred it will be obvious that various changes and modifications may be made therein without departing from the spirit and scope of the invention. For example, although the examples provided herein relate particularly to a currency processing machine, the present concepts may be extended to document processing machines, including those that process security paper or other documents having value.

The invention claimed is:

1. A currency processing system data storage arrangement, comprising:
 a currency processing system comprising a first controller, a communication interface, and at least one sensor arranged to output to the first controller raw data associated with a sensed characteristic of processed currency bills; and
 a memory data storage defining a database for storing at least one of the raw data or derivative data associated therewith received from the first controller through the communication interface,
 wherein the derivative data corresponds to statistical data associated with the raw data,
 wherein the memory data storage is accessible by at least one of the first controller and a second controller through at least one of the communication interface and another communication interface, and
 wherein the at least one of the first controller and the second controller is permitted, responsive to an authorization, to update a currency processing system variable affecting, for subsequent output signals, at least one of an output signal by the sensor and an output signal from the first controller, the output signal from the first controller comprising at least one of a signal bearing the raw data and a signal bearing derivative data therefrom.

2. A currency processing system data storage arrangement according to claim 1, wherein the currency processing system comprises a plurality of sensors, each of the plurality of the sensors arranged to sense at least one characteristic of a processed currency bill and output a signal bearing data corresponding to the at least one characteristic to the first controller.

3. A currency processing system data storage arrangement according to claim 1, wherein the currency processing system is configured to transport the currency bills with a long edge of the currency bills comprising a leading edge.

4. A currency processing system data storage arrangement, comprising:
 a currency processing system comprising a first controller, a communication interface, and at least one sensor arranged to output to the first controller raw data associated with a sensed characteristic of processed currency bills; and
 a memory data storage defining a database for storing at least one of the raw data or derivative data associated therewith received from the first controller through the communication interface,
 wherein the derivative data corresponds to statistical data associated with the raw data,
 wherein the memory data storage is accessible by at least one of the first controller and a second controller through at least one of the communication interface and another communication interface,
 wherein the currency processing system comprises a plurality of sensors, each of the plurality of the sensors arranged to sense at least one characteristic of a processed currency bill and output a signal bearing data corresponding to the at least one characteristic to the first controller, and
 wherein the memory data storage defines a plurality of databases, each of the plurality of databases being adapted to receive data corresponding to a designated one of the plurality of sensors.

5. A currency processing system data storage arrangement according to claim 4, wherein the second controller comprises a computer.

6. A currency processing system data storage arrangement, comprising:
 a currency processing system comprising a first controller, a communication interface, and at least one sensor arranged to output to the first controller raw data associated with a sensed characteristic of processed currency bills; and
 a memory data storage defining a database for storing at least one of the raw data or derivative data associated therewith received from the first controller through the communication interface,
 wherein the derivative data corresponds to statistical data associated with the raw data,
 wherein the memory data storage is accessible by at least one of the first controller and a second controller through at least one of the communication interface and another communication interface,
 wherein the currency processing system comprises a plurality of sensors, each of the plurality of the sensors arranged to sense at least one characteristic of a processed currency bill and output a signal bearing data corresponding to the at least one characteristic to the first controller,
 wherein the second controller comprises a computer, and
 wherein the at least one of the first controller and the second controller is permitted, responsive to an authorization, to update a currency processing system variable affecting, for subsequent output signals, at least one of an output signal by the sensor and an output signal from the first controller, the output signal from the first controller comprising at least one of a signal bearing the raw data and a signal bearing derivative data therefrom.

7. A currency processing system data storage arrangement according to claim 6, wherein the currency processing system variable comprises at least one of a sensor setting and a controller-executable instruction set.

8. A currency processing system, comprising:
 a currency bill processing device;
 a first controller operatively associated with the currency processing device;
 a communication interface operatively connecting the currency processing device with a second controller remote from the first controller;
 at least one sensor arranged within the currency processing device to output to the first controller raw data associated with a sensed characteristic of a processed currency bill; and
 at least one memory data storage configured to store the raw data, or derivative data associated therewith, output from the first controller through the communication interface,
 wherein the derivative data corresponds to statistical data associated with the raw data,
 wherein the at least one memory data storage is accessible by at least one of the first controller and the second controller through at least one of the communication interface and another communication interface, and
 wherein the at least one of the first controller and the second controller is configured to update at least one currency processing system variable affecting, for subsequent output signals, at least one of an output signal by the sensor and an output signal from the first controller, the output signal from the first controller comprising at least one of a signal bearing the raw data and a signal bearing derivative data therefrom.

* * * * *